United States Patent
Preta

(10) Patent No.: US 6,955,511 B1
(45) Date of Patent: Oct. 18, 2005

(54) RETRACTABLE ANCHOR DEVICE AND METHOD OF MOUNTING THE ANCHOR DEVICE

(76) Inventor: John Preta, 11605 Coldstream Dr., Potomac, MD (US) 20854

( * ) Notice: Subject to any disclaimer, the term of this patent is extended or adjusted under 35 U.S.C. 154(b) by 0 days.

(21) Appl. No.: 10/819,195

(22) Filed: Apr. 7, 2004

Related U.S. Application Data

(63) Continuation of application No. 10/153,825, filed on May 24, 2002, now Pat. No. 6,764,259.

(51) Int. Cl.[7] ............................................... B60P 7/08
(52) U.S. Cl. ..................... 410/107; 410/106; 410/111
(58) Field of Search ............................... 410/106–113; 248/499; 24/265 CD, 115 K; 114/218

(56) References Cited

U.S. PATENT DOCUMENTS

| | | |
|---|---|---|
| 2,609,761 A | 9/1952 | Clark |
| 2,614,871 A | 10/1952 | Grizzard et al. |
| 2,729,417 A | 1/1956 | Maynard |
| 2,729,418 A | 1/1956 | Maynard |
| 3,102,708 A | 9/1963 | Crain |
| 3,142,264 A | 7/1964 | De Boer |
| 3,252,681 A | 5/1966 | Watts |
| 3,275,284 A | 9/1966 | Gary |
| 3,365,162 A | 1/1968 | Davis |
| 3,377,039 A | 4/1968 | Hayes |
| 3,412,693 A | 11/1968 | Lewis |
| 3,917,213 A | 11/1975 | Poehlmann |
| 3,960,091 A | 6/1976 | Ehlert |
| 4,072,113 A | 2/1978 | Thurston |
| 4,126,095 A | 11/1978 | Tillery |
| 4,315,707 A | 2/1982 | Fernbach |
| 4,672,909 A | 6/1987 | Sweetsir |
| 4,715,754 A | 12/1987 | Scully |
| 4,741,653 A | 5/1988 | Schmidt |
| 4,762,449 A | 8/1988 | St. Pierre et al. |
| 4,820,093 A | 4/1989 | Hirakui et al. |
| 4,903,876 A | 2/1990 | Bott |
| 4,907,921 A | 3/1990 | Akright |
| 4,945,849 A | 8/1990 | Morris et al. |
| 5,052,869 A | 10/1991 | Hansen, II |
| 5,106,248 A | 4/1992 | Harris |
| 5,302,064 A | 4/1994 | Davis |
| 5,443,341 A | 8/1995 | Hamilton |
| 5,444,897 A | 8/1995 | Gross |
| 5,788,437 A | 8/1998 | Kalis, Jr. |
| 5,971,684 A | 10/1999 | Wang |
| 6,059,499 A | 5/2000 | Bird |
| 6,065,917 A | 5/2000 | Shambeau et al. |
| 6,125,779 A | 10/2000 | Czipri |
| 6,139,235 A | 10/2000 | Vander Koy et al. |
| 6,142,718 A | 11/2000 | Kroll |
| 6,213,696 B1 | 4/2001 | Austin |
| 6,231,285 B1 | 5/2001 | Elwell et al. |
| 6,241,440 B1 | 6/2001 | Orlebeke |
| 6,290,441 B1 | 9/2001 | Rusu |
| 6,464,437 B1 | 10/2002 | Elwell |
| 6,565,301 B1 | 5/2003 | Lin |
| 6,637,992 B1 | 10/2003 | Chang |
| 6,764,259 B1 * | 7/2004 | Preta ........................... 410/107 |

* cited by examiner

*Primary Examiner*—Stephen Gordon

(57) ABSTRACT

Method of installing a retractable anchor device on a surface. The method includes forming at least one opening in the surface, at least one of fixing, attaching, fastening and removably securing the mounting part to the surface, and ensuring that the U-shaped member is movable between the extended position and the retracted position. The U-shaped member moves from the extended position to the retracted position when the U-shaped member experiences the predetermined external force.

20 Claims, 23 Drawing Sheets

RETRACTABLE ANCHOR DEVICE AND METHOD OF MOUNTING THE ANCHOR DEVICE

CROSS-REFERENCE TO RELATED APPLICATIONS

The present application is a continuation of U.S. application Ser. No. 10/153,825 filed May 24, 2002 now U.S. Pat. No. 6,764,259 issued Jul. 20, 2004, the disclosure of which is expressly incorporated by reference herein in its entirety.

BACKGROUND OF THE INVENTION

1. Field of the Invention

The invention relates to a retractable anchor device which can be used to tie-down articles. The anchor is particularly useful when mounted to vehicles or boats. The anchor may also be used on military vehicles such as trucks, transport aircraft and ships, as well as, on vehicles which are designed to operate in the near zero gravity of space.

In one embodiment, the anchor device is attached to a surface and has a retractable U-shaped member to which a rope, strap, wire or other tension member (flexible or otherwise) can be secured. The U-shaped member is biased towards a retracted position and the anchor uses a locking system which holds the U-shaped member in the extended position. If the U-shaped member experiences a sufficient external force, (i.e., a sufficient to disengage the locking system) the U-shaped member is automatically caused to retract towards the retracted position. In another embodiment of the anchor, an actuator/sensing system is utilized to facilitate this safety retracting function. In still another embodiment of the anchor, the rear portion of the anchor, i.e., the part which seats into the surface, is enclosed by a sealed housing or dust cover. In still another embodiment of the anchor, each of two cylindrical portions of the anchor, which seat into the surface, is enclosed by a sealed housing or dust cover. In still another embodiment of the anchor, the anchor has a fixed outer portion which is fixedly mounted to the surface and a rotatable inner portion which rotates with the U-shaped member. In still another embodiment of the anchor, a flange plate is mountable to the anchor. In still another embodiment, the anchor uses a rotational locking system.

2. Discussion of Background Information

Various types of anchoring devices are known. It is also known to utilize anchors which have portions that are retractably mounted to a surface.

Thus, for example, U.S. Pat. No. 2,609,761 discloses a cargo securing mechanism. U.S. Pat. No. 2,614,871 discloses an anchor for cargo tie-down devices. U.S. Pat. No. 2,729,417 and U.S. Pat. No. 2,729,418 both discloses retractable lashing attachment devices. U.S. Pat. No. 3,102,708 discloses a retractable rope hook. U.S. Pat. No. 3,142,264 discloses panel mounted tie-down terminals. U.S. Pat. No. 3,252,681 discloses a fastening device. U.S. Pat. No. 3,275,284 discloses an extensible and retractable tie-down fitting. U.S. Pat. No. 3,365,162 discloses flush seating, watertight and airtight anchorages for tie down gear and other equipment. U.S. Pat. No. 3,377,039 discloses a tie down anchor. U.S. Pat. No. 3,412,693 discloses a cargo anchoring device. U.S. Pat. No. 3,917,213 discloses an adjustable tie down device. However, none of these documents disclose a U-shaped member which can slidably retract and/or which is either biased towards a retracted position or is movable towards a retracted position via an actuator.

Additionally, U.S. Pat. No. 3,960,091 describes a rope hook mount for attachment to the body of a vehicle. The device is described as having a mounting flange with a face conforming generally to the contour of the portion of the body of the vehicle upon which the mount is to be secured. The flange includes a raised portion integral therewith and extending outwardly away from the face of the flange. An aperture is formed in the raised portion and an elongated lip member extends inwardly from the raised portion toward the aperture. The lip member has an outer surface which is generally flush with the outer surface of the raised portion and an inner surface spaced from the face of the flange so that a rope or the like may be looped around the lip member and retained in position by both the lip member and the walls of the aperture.

U.S. Pat. No. 4,072,113 describes a cargo tie down anchor unit which can be attached to automotive vehicles, or the like, featuring a slidable anchoring element which can be retracted into the anchor unit housing wherein the slidable anchoring element is positioned out of sight when not in use.

U.S. Pat. No. 4,126,095 describes a tie-down fitting comprising a body for attachment to fixed structure. The body includes a recess within which an elongated tang is pivotally fitted. A rope or line may be laid in transverse depressions in the body. One end of the tang can be pressed to project the opposite end above the transverse depressions. On release, the tang is biased toward the depressions to hold the line. A strain on the line moves the tang to its projected, tie-down position.

U.S. Pat. No. 4,315,707 describes a load carrying vehicle. A plurality of back-up assemblies is mounted on beam members which support the load. Each back-up assembly includes an upright support member mounted on one of the beams, an upright sliding member slidably mounted on the support member for up and down sliding movement and a cap plate at an upper end of the sliding member for movement between a lowered position and a raised position. Timbers supported by the beams can engage sliding members of the back-up assemblies. Cap plates of a selected pair of back-up assemblies rest on each timber and the timer can engage sliding members of the pair of back-up assemblies.

U.S. Pat. No. 4,672,909 describes a cleat which is adapted to be moved between a stored position substantially flush with the deck of a marine vessel and an operative position projecting above the deck. The cleat is supported on a stem slidably mounted in a cylindrical opening in a housing member. The inner end of the stem is provided with a pin projecting laterally into a groove cut into the wall of the cylindrical opening in the housing. The grooves define a pathway for the pin to travel of such a configuration that the cleat can be moved from one position to another by partially withdrawing the stem from the housing and rotating it about its longitudinal axis to a predetermined degree in order to assume the second position. The cleat and housing are free of moving parts, are characterized by remarkable ease of operation and can be readily fabricated from corrosion resistant materials.

U.S. Pat. No. 4,715,754 describes in a flat bed cargo vehicle having a series of upwardly-opening pockets spaced there along, and cargo tie-down anchor members swingably disposed therein. Each pocket has a porous bottom wall permitting water to drain out of the pocket and each bottom wall comprises a series of baffles preventing flames in the zone beneath the pocket from traveling directly upwardly through the pores defined by the baffles, to detonate ammunition located on the bed.

U.S. Pat. No. 4,741,653 describes a plurality of securing devices which are attached to a supporting member for use in securing cargo to the supporting member. Each device includes a body member for being attached to the supporting member and an arm member pivotally attached to the body member for movement between a down position in which all of the arm member is positioned below the support plane of the supporting member so as not to interfere with the use of the supporting member and an up position in which a portion of the first end of the arm member extends above the support plane of the supporting member to allow the cargo to be secured relative thereto.

U.S. Pat. No. 4,762,449 describes a tie down fitting adapted to fit within a stake hole in a side wall section of a pickup truck. The fitting includes a clamping plate dimensioned for insertion through the stake hole for engagement with the underside of the wall section. A cover plate engages the upper side of the section and is secured to the clamping plate by threaded fasteners. Aligned slots in the plates receive a hook member for pivotal movement between a recessed position flush with the wall section to a projected position where it is adapted for engagement by a cargo securing line or the like. A number of such fittings enable securement of cargo on the truck bed. In its recessed position the fitting is pressed to pivot it toward its projected position. Its center of gravity tends to maintain it in either its recessed or its projected position.

U.S. Pat. No. 4,903,876 describes an article securing assembly for receiving a device to secure an object on a plurality of elongated slats mounted on an exterior horizontal surface of an automobile. The assembly includes a cavity in at least one of the slats. A tie-down member is disposed within the cavity for pivotal movement between a closed position in which the upper surface of the tie-down member does not extend above the upper surface of the slat and an open position such that a portion of the tie-down member extends above the upper surface of the slat.

U.S. Pat. No. 4,907,921 describes a tie-down assembly is disclosed which includes a plastic guard rail that defines a central floor and spaced, parallel interior walls which cooperate to define a recess, a pair of beveled exterior surfaces disposed outside of the respective interior walls, and an array of slits in the floor. A clamp formed of a folded piece of sheet metal defines a sleeve section disposed in the recess and a shank section which passes through one of the slits in the floor. A tie-down ring is pivotally mounted in the sleeve section and is movable between a stowed position, in which no part of the clamp or tie-down member extends out of the recess, and a use position. Aligned openings are defined by the floor and the shank section of the clamp, and a single fastener can be positioned to pass through the aligned openings in order to secure the entire tie-down assembly in place.

U.S. Pat. No. 4,945,849 describes a retractable boat cleat which moves alternately between extended and retracted positions upon alternate depressions of the cleat. A pivotal latch with notched ends cooperates with a specially spaced recess in the cleat and a pair of compression springs to provide the alternate extension and retraction.

U.S. Pat. No. 5,052,869 describes a tie down assembly includes a mounting plate and a cross bar. The cross bar defines an integral post and two opposed recesses which receive ends of a tie down bail. The integral post passes through a bearing washer and a central opening in the central panel and defines an enlarged head that secures the tie down assembly together.

U.S. Pat. No. 5,106,248 describes a device that has a hollow housing adaptable to be mounted in a marine deck and a spring-biased cleat is telescopically vertically movable therein. The cleat has a rotatably mounted cylinder cam which is engaged by one or more pins that function as cam followers and are releasably mounted to the housing. The cleat is selectively movable to its extended operating position by causing the rotation of the cam to position a different portion of the cam path or groove adjacent the follower via temporary downward force on the cleat and is thereafter automatically locked upon the next temporary force thereon to further rotate the cam.

U.S. Pat. No. 5,302,064 describes a cargo tie down permanently installable to the bed or floor of the cargo area of a pickup truck, trailer, or other vehicle, provides security for relatively thin, flat or narrow articles (e.g., sheet material, pipe, elongate extrusions, etc.) carried on the bed or floor. The tie downs are preferably installed in pairs, on opposite sides of the floor or bed. Each tie down may include one or more tie down rings or U-bolts, providing for the securing of a rope or other retainer laterally across the floor or bed. The device includes counterbores in the bottom, to provide clearance for the attachment fittings used to secure the U-bolts and/or rings in the device, and allowing for flush mounting of the device to the underlying surface. The device is formed to eliminate sharp edges, in order to better protect any articles with which it might come in contact, and includes a recess at each U-bolt or ring for clearance of the rope or retainer. The main body of the device may be formed of a variety of materials, such as aluminum or steel, either standard or stainless, or even plastic.

U.S. Pat. No. 5,444,897 describes a hook that is reciprocable between a recessed inoperative position and an exposed operative position and comprises a housing formed with a cylindrical side wall which has an open exterior end and an interior end with a circular end cap enclosing the side wall at the interior end to define a cylindrical opening therebetween. A flange extends radially outwardly from the open exterior end. A pair of apertures are formed through a central axial extent of the side wall at diametrically opposed locations and exteriorly facing marking notches formed on the exterior surface of the flange in circumferential alignment with the apertures. A support is positioned within the opening of the housing. The support has an interior extent in a cylindrical configuration and a forward extent with a hook. The cylindrical extent includes a pair of recesses. A pair of leaf springs each have a forward end, a rearward end and a central portion therebetween. The forward end is secured to the exterior surface of the housing. The rearward end is movable radially with respect to its associated aperture. The central portion has a forward extent and a rearward extent and extends into the housing. A coil spring is located between the forward surface of the end cap and the rearward surface of the housing and urges the housing to the deployed orientation.

U.S. Pat. No. 5,788,437 describes a cargo tie down assembly and method of use thereof for a vehicle platform. The tie down assembly includes a tie down member for securing cargo on such a vehicle platform. The tie down member has an opening therethrough. An anchor is adapted to extend in a first opening in a rail of such a vehicle platform. The anchor extends across the opening in the tie down member for restricting movement of the tie down member between an operative and a retracted position.

U.S. Pat. No. 5,971,684 describes a flush-mounted, spring-activated utility hook assembly designed to be attached to the side rails of a pick-up truck or to a vertical wall. The assembly consists of a cover plate having a hook slot from where a spring-biased utility hook pivots from a retracted position to an extended functional position. The assembly incorporates a hook release assembly which includes a hook release tab that projects from the surface of the cover plate. When the assembly is not in use, the utility hook is maintained in a retracted position by the hook release assembly. When the hook release tab is moved outward, the assembly releases and causes the hook to move into its extended functional position. When a pair of assemblies are attached to a truck, a tie-down cord can be attached between the two hooks to secure a load. When the assembly is attached to a vertical wall, it can be used to hang a variety of items when the hook is placed in the extended position.

U.S. Pat. No. 6,059,499 describes a retractable strap assembly is provided including a housing. Also included is a threaded post and a pair of clamps for removably and fixedly mounting the housing to a vehicle. Next included is a spool assembly situated within the housing and having a strap with a coupler on an end thereof. The strap is capable of being retracted within the housing.

U.S. Pat. No. 6,065,917 describes a tie-down anchor for strapping cargo to a cargo bed. The tie-down anchor includes a receptacle member, which in turn includes a base and a mounting flange secured to the base. The mounting flange is mounted to the cargo bed in alignment with a mounting hole in the bed. A strap-receiving member is disposed in the receptacle member supported on the base for floating rotary and pivotal movement. The strap-receiving member includes a base leg having a length greater than the diameter of the mounting hole and an extension fixed to the base leg to create an opening for receiving the strap. The extension is narrower than the mounting hole so that the extension may pass through the mounting hole and extend above the bed.

U.S. Pat. No. 6,125,779 describes a cleat assembly including a housing and a securing members mounted therein for movement between operative and inoperative positions and a spring loaded poppit carried by the securing members and registerable with detents carried by the housing. The detents having openings therein confluent with the surface of the housing.

U.S. Pat. No. 6,142,718 describes a vehicle cargo tie-down apparatus includes a grommet rotatably retaining a pin having an attached tie-down ring. The grommet has a generally tubular body with the pin positioned in a central aperture. Typically, the grommet body is positioned in a larger diameter first aperture in a trim piece and has a pair of resilient legs extending through a smaller diameter second aperture in a supporting wall covered by the trim piece. The pin is rotatably retained in the central aperture by a radially extending flange at one end and a locking flange at an opposite end and the legs prevent removal of the grommet from the supporting wall.

U.S. Pat. No. 6,213,696 describes a cargo restraint has a D-ring with cold-headed opposed end portions spaced slightly apart and trapped in a gap in a passageway of an anchor bracket and tensioned against edges of the gap to prevent rattling and withdrawal of the ends of the D-ring out of the bracket.

U.S. Pat. No. 6,231,285 describes a pop-up tie down device includes a body member having an attachment member for securing the body member to the stake hole of a side wall in a vehicle carrier. The anchor member includes a cavity which holds a pop-up tie down device. The pop-up tie down device is movable from a retracted position within the cavity to an extended position wherein a portion of the tie down device protrudes from the cavity.

U.S. Pat. No. 6,241,440 describes a tethering device for anchoring a tether has a cup rotatably held within a cylinder, with the cylinder mounted approximately flush in a flat surface, such as a boat deck. A loop of fibrous material, such a strap, has a first end removably anchored in the cup by passing around an anchoring pin. A second fibrous loop end is exposed above the deck surface for tethering a block, fitting, or the like. The tethering device provides for a low profile tether anchor, for rotation of the loop, and is water tight to prevent water flow through the device.

U.S. Pat. No. 6,290,441 describes a stake pocket tie down for a motor vehicle having a cargo area defined by a first sidewall, a second sidewall, a bed and a tailgate is disclosed. The first sidewall has a stake pocket defined by a top surface and a downwardly extending flange. The stake pocket tie down includes a cap, a first locking plate and a second locking plate. The cap has a wall with a first aperture and a second aperture and a flange radially extending from the wall. The first locking plate has male clasp and a finger disposed in the first aperture. The second locking plate has female clasp engaged with the male clasp and a finger disposed in the second aperture.

Such anchors, however, do not have the ability to retract completely out of the way when they experience a predetermined external force. None of these anchor or tie-down devices allow the fixing device to retract completely out of the way or to disappear into a body. Accordingly, none of these devices retract a U-shaped member out of the way so that it will not catch an occupant's clothing. Moreover, such devices do not have a locking system which locks the a U-shaped member in an extended position while being biased towards a retracted position. Finally, none of these device disclose the use of an actuator to control the position of the U-shaped member, much less, an actuator which uses a load-sensing and/or force-sensing system/circuit/device to ensure that the U-shaped member is moved to an extended position and/or moved to a retracted position when subjected to a predetermined external force. Finally, none of the prior art devices disclose of suggest a U-shaped member which is both rotatably mounted and biased towards the retracted position, or one which discloses any of the embodiments described herein, or which have their inherent advantages.

SUMMARY OF THE INVENTION

The invention provides for a retractable anchor device that includes a mounting part which is securable to a surface and a generally U-shaped member to which a tension member can be secured. The U-shaped member is slidably mounted to the mounting part and includes a first end and a second end. A retracting system that causes the U-shaped member to move to a retracted position when the U-shaped member experiences a predetermined external force sufficient to disengage the locking system is also provided. The retracting system comprises at least one of first and second biasing mechanisms wherein the first biasing mechanism biases the first end towards the retracted position and the second biasing mechanism biases the second end towards the retracted position, and an actuator, wherein the actuator moves the U-shaped member towards at least one of the extended position and the retracted position, and wherein the U-shaped member is movable between the extended position whereby at least a portion of the U-shaped member is positioned above an upper surface of the mounting part to the retracted position whereby the U-shaped member is positioned approximately flush with or below the upper surface of the mounting part.

The mounting part may include an outer mounting part which is configured to be fixed to the surface and an inner movable mounting part and the U-shaped member may be slidably movably mounted to the inner movable mounting part.

The retractable anchor may further include a locking system which releasably locks the U-shaped member in the extended position, wherein the locking system includes a first locking mechanism which releasably prevents movement the first end towards the retracted position and a second locking mechanism which releasably prevents movement the second end towards the retracted position.

The retracting system may include the actuator, wherein the actuator is configured to move the U-shaped member towards at least one of the extended position and the retracted position. The retractable anchor may further include one of a force sensing system and a load sensing system configured to cause the actuator to move the U-shaped member towards the retracted position.

The first end may include an enlarged portion which releasably engages first locking mechanism and the second end may include an enlarged portion which releasably engages second locking mechanism.

The mounting part may include indented or recessed surfaces which allow a user to grip the U-shaped member with the user's fingers, whereby the user can move the U-shaped member to an extended position.

The retracting system may include the first and second biasing mechanisms, the first biasing mechanism being mounted onto the first end in an area between an end of the first end and a bottom surface of the mounting part and the second biasing mechanism being mounted onto the second end in an area between an end of the second end and a bottom surface of the mounting part. The retractable anchor may further include a first sealing member arranged to provide sealing between the first end and the mounting part and a second sealing member arranged to provide sealing between the second end and the mounting part.

The retractable anchor may further include a first nut which releasably engages a first locking member and a second nut which releasably engages a second locking member. The retracting system may include the first and second biasing mechanisms, the first biasing mechanism being a first spring and the second biasing mechanism being a second spring, the first spring being mounted onto the first end in an area between the first nut and a bottom surface of the mounting part and the second spring being mounted onto the second end in an area between the second nut and a bottom surface of the mounting part.

The retractable anchor may further include one of a housing, an enclosure, and a cover mounted to a back portion of the mounting part.

The retractable anchor may further include a first cover mounted to a back portion of the mounting part and a second cover mounted to a back portion of the mounting part, the first cover preventing debris from contacting the first end and the second cover preventing debris from contacting the second end.

The retractable anchor may further include first and second locking mechanisms which each comprise a cylindrical member that includes an internal projection and slots. The mounting part may include a first cylindrical section which projects from a back surface of the mounting part and a second cylindrical section which projects from a back surface of the mounting part, each of the first and second locking mechanisms being respectively mounted to the first and second cylindrical sections.

The invention also provides for a retractable anchor device that includes a mounting part which is securable to a surface and a generally U-shaped member to which a tension member can be secured. The U-shaped member is slidably mounted to the mounting part and includes a first end and a second end. A locking system releasably locks the U-shaped member in the extended position. The locking system comprises a first locking mechanism which releasably prevents movement the first end towards the retracted position and a second locking mechanism which releasably prevents movement the second end towards the retracted position. A retracting system causes the U-shaped member to move to a retracted position when the U-shaped member experiences a external force sufficient to disengage the locking system. The U-shaped member is movable between the extended position whereby at least a portion of the U-shaped member is positioned above an upper surface of the mounting part to the retracted position whereby the U-shaped member is positioned approximately flush with or below the upper surface of the mounting part.

The mounting part may include an outer mounting part which is configured to be fixed to the surface and an inner movable mounting part, wherein the U-shaped member is slidably movably mounted to the inner movable mounting part.

The retracting system may include a first biasing mechanism biasing the first end towards the retracted position and a second biasing mechanism biasing the second end towards the retracted position.

The retracting system may include an actuator, wherein the actuator is configured move the U-shaped member towards at least one of the extended position and the retracted position. The retractable anchor may further comprise one of a force sensing system and a load sensing system configured to cause the actuator to move the U-shaped member towards the retracted position.

The first end may include an enlarged portion which releasably engages first locking mechanism and the second end may include an enlarged portion which releasably engages second locking mechanism. The enlarged portions may be nuts.

The mounting part may include indented or recessed surfaces which allow a user to grip the U-shaped member with the user's fingers, whereby the user can move the U-shaped member to an extended position against the biasing force of the biasing mechanisms.

The retracting system may include a first spring and a second spring, the first spring being mounted onto the first end in an area between an end of the first end and a bottom surface of the mounting part and the second spring being mounted onto the second end in an area between an end of the second end and a bottom surface of the mounting part. The retractable anchor may further include a first sealing member arranged to provide sealing between the first end and the mounting part and a second sealing member arranged to provide sealing between the second end and the mounting part.

The retractable anchor may further include a first nut which releasably engages the first locking member and a second nut which releasably engages the second locking member. The retractable anchor may further include a first spring and a second spring, the first spring being mounted onto the first end in an area between the first nut and a bottom surface of the mounting part and the second spring being mounted onto the second end in an area between the second nut and a bottom surface of the mounting part.

The retractable anchor may further include one of a housing, an enclosure, and a cover mounted to a back portion of the mounting part.

The retractable anchor may further include a first cover mounted to a back portion of the mounting part and a second cover mounted to a back portion of the mounting part, the first cover preventing debris from contacting the first end and the second cover preventing debris from contacting the second end.

Each of a first and second locking mechanisms may be a cylindrical member which includes an internal shoulder and slots.

The mounting part may include a first cylindrical section which projects from a back surface of the mounting part and a second cylindrical section which projects from a back surface of the mounting part, each of a first and second locking mechanisms being respectively secured to the first and second cylindrical sections.

The invention still further provides for a retractable anchor device that includes a mounting part which is securable to a surface, a generally U-shaped member to which a tension member can be secured, the U-shaped member being slidably mounted to the mounting part and including a first end and a second end, a locking system which releasable locks the U-shaped member in the extended position, the locking system comprising a first locking mechanism configured to prevent movement the first end towards the retracted position and a second locking mechanism configured to prevent movement the second end towards the retracted position, a first nut mounted to the first end, the first nut being configured to releasably engage the first locking member, a second nut mounted to the second end, the second nut being configured to releasably engage the second locking member, a first biasing mechanism mounted to the first end between the first nut and the mounting part, a second biasing mechanism mounted to the second end between the second nut and the mounting part, and each of the first and second biasing mechanisms respectively biasing the first and second ends towards the retracted position, wherein the U-shaped member is movable between the extended position whereby at least a portion of the U-shaped member is positioned above an upper surface of the mounting part to the retracted position whereby the U-shaped member is positioned approximately flush with or below the upper surface of the mounting part.

The mounting part may include an outer mounting part which is configured to be fixed to the surface and an inner movable mounting part, wherein the U-shaped member is slidably movably mounted to the inner movable mounting part.

The retracting system may include an actuator, wherein the actuator is configured move the U-shaped member towards at least one of the extended position and the retracted position.

The invention also contemplates a retractable anchor device that includes a mounting part which is securable to a surface, the mounting part comprises a first cylindrical section which projects from a back surface of the mounting part and a second cylindrical section which projects from a back surface of the mounting part, a generally U-shaped member to which a tension member can be secured, the U-shaped member being slidably mounted to the mounting part and including a first end and a second end, a locking system which releasable locks the U-shaped member in the extended position, the locking system comprising a first locking mechanism configured to prevent movement the first end towards the retracted position and a second locking mechanism configured to prevent movement the second end towards the retracted position, each of a first and second locking mechanisms being respectively secured to the first and second cylindrical sections of the mounting part, a first enlarged diameter portion arranged on the first end, the first enlarged diameter portion being configured to releasably engage the first locking member, a second enlarged diameter portion arranged on the second end, the second enlarged diameter portion being configured to releasably engage the second locking member, a first biasing mechanism mounted to the first end between the first enlarged diameter portion and the mounting part, a second biasing mechanism mounted to the second end between the second enlarged diameter portion and the mounting part, each of the first and second biasing mechanisms respectively biasing the first and second ends towards the retracted position, wherein the U-shaped member is movable between the extended position whereby at least a portion of the U-shaped member is positioned above an upper surface, of the mounting part, to the retracted position whereby the U-shaped member is positioned approximately flush with or below the upper surface of the mounting part.

The invention also provides for a retractable anchor device that includes a mounting part which is securable to a surface, a generally U-shaped member to which a tension member can be secured, the U-shaped member being slidably mounted to the mounting part and including a first end and a second end, a retracting system that causes the U-shaped member to move to a retracted position when the U-shaped member experiences a predetermined external force sufficient to disengage the locking system, and the retracting system comprising at least one of (a) first and second biasing mechanisms wherein the first biasing mechanism biases the first end towards the retracted position and the second biasing mechanism biases the second end towards the retracted position, or (b) an actuator, wherein the actuator moves the U-shaped member towards at least one of the extended position and the retracted position. The U-shaped member is movable between the extended position whereby at least a portion of the U-shaped member is positioned above an upper surface of the mounting part, and the retracted position whereby the U-shaped member is positioned approximately flush with or below the upper surface of the mounting part.

The invention also provides for a retractable anchor device that includes a mounting part which is securable to a surface, a generally U-shaped member to which a tension member can be secured, the U-shaped member being slidably mounted to the mounting part and including a first end and a second end, a locking system which releasable locks the U-shaped member in the extended position, the locking system comprising a first locking mechanism configured to prevent movement the first end towards the retracted position and a second locking mechanism configured to prevent movement the second end towards the retracted position, a first nut mounted to the first end, a second nut mounted to the second end, a first biasing mechanism mounted to the first end between the first nut and the mounting part, a second biasing mechanism mounted to the second end between the second nut and the mounting part, and each of the first and second biasing mechanisms respectively biasing the first and second ends towards the retracted position, wherein the U-shaped member is movable between the extended position whereby at least a portion of the U-shaped member is positioned above an upper surface of the mounting part to the retracted position whereby the U-shaped member is positioned approximately flush with or below the upper surface of the mounting part.

The invention also provides for a retractable anchor device which utilizes a mounting part which is securable to a surface, the mounting part comprises a first cylindrical section which projects from a back surface of the mounting part and a second cylindrical section which projects from a back surface of the mounting part, a generally U-shaped member to which a tension member can be secured, the U-shaped member being slidably mounted to the mounting part and including a first end and a second end, a locking system which releasable locks the U-shaped member in the extended position, the locking system comprising a first locking mechanism configured to prevent movement the first end towards the retracted position and a second locking mechanism configured to prevent movement the second end towards the retracted position, a first enlarged diameter portion arranged on the first end, a second enlarged portion arranged on the second end, a first biasing mechanism mounted to the first end between the first enlarged portion and the mounting part, a second biasing mechanism mounted to the second end between the second enlarged portion and the mounting part, and each of the first and second biasing mechanisms respectively biasing the first and second ends towards the retracted position, wherein the U-shaped member is movable between the extended position and the retracted position.

The invention further provides for a method of installing any one of the herein mention retractable anchor devices wherein the method includes forming at least one opening in the surface wherein the at least one opening is sized to receive a portion which projects from a back surface of the mounting part and at least one of fixing, attaching, fastening and removably securing the mounting part to the surface.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 13a shows a cross-section enlarged view of the left side cylindrical section and a portion of the mounting part shown in FIGS. 8, 9 and 11. FIG. 13b shows a cross-section enlarged view of the seal before it is slid onto an end of the U-shaped member and into the cylindrical section. FIG. 13c shows a cross-section enlarged view of the spring before it is slid onto an end of the U-shaped member and into the cylindrical section. FIG. 13d shows a cross-section enlarged view of the nut before it is threadably mounted onto an end of the U-shaped member;

FIG. 14a shows a cross-section enlarged view of the left side cylindrical section shown in FIG. 13a with the seal, spring and nut already installed on an end of the U-shaped member. FIG. 14b shows a cross-section enlarged view of the locking device before it is slidably mounted onto the cylindrical section;

FIG. 22a shows a cross-section enlarged view of the left side cylindrical section shown in FIG. 13a with the seal, spring, locking member, and nut already installed on an end of the U-shaped member. FIG. 22b shows a partial cross-section enlarged view of how locking device would be retained between a shoulder of one end of the U-shaped member and a nut; FIG. 23 shows a cross-section enlarged view of the left side cylindrical section different from the one shown in FIG. 13a in that a groove is not utilized to axially retain the locking member. Instead, the locking member is axially fixed to the cylindrical section by any desired attachment technique such as fasteners or adhesives.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Moreover, the various embodiments are shown having relative scale (i.e., enabling one to compare relative sizes of the various features) for the purpose of illustrating various preferred embodiments. However, the invention contemplates numerous variations in sizes as well as relative sizes of the various features.

Figure 1:
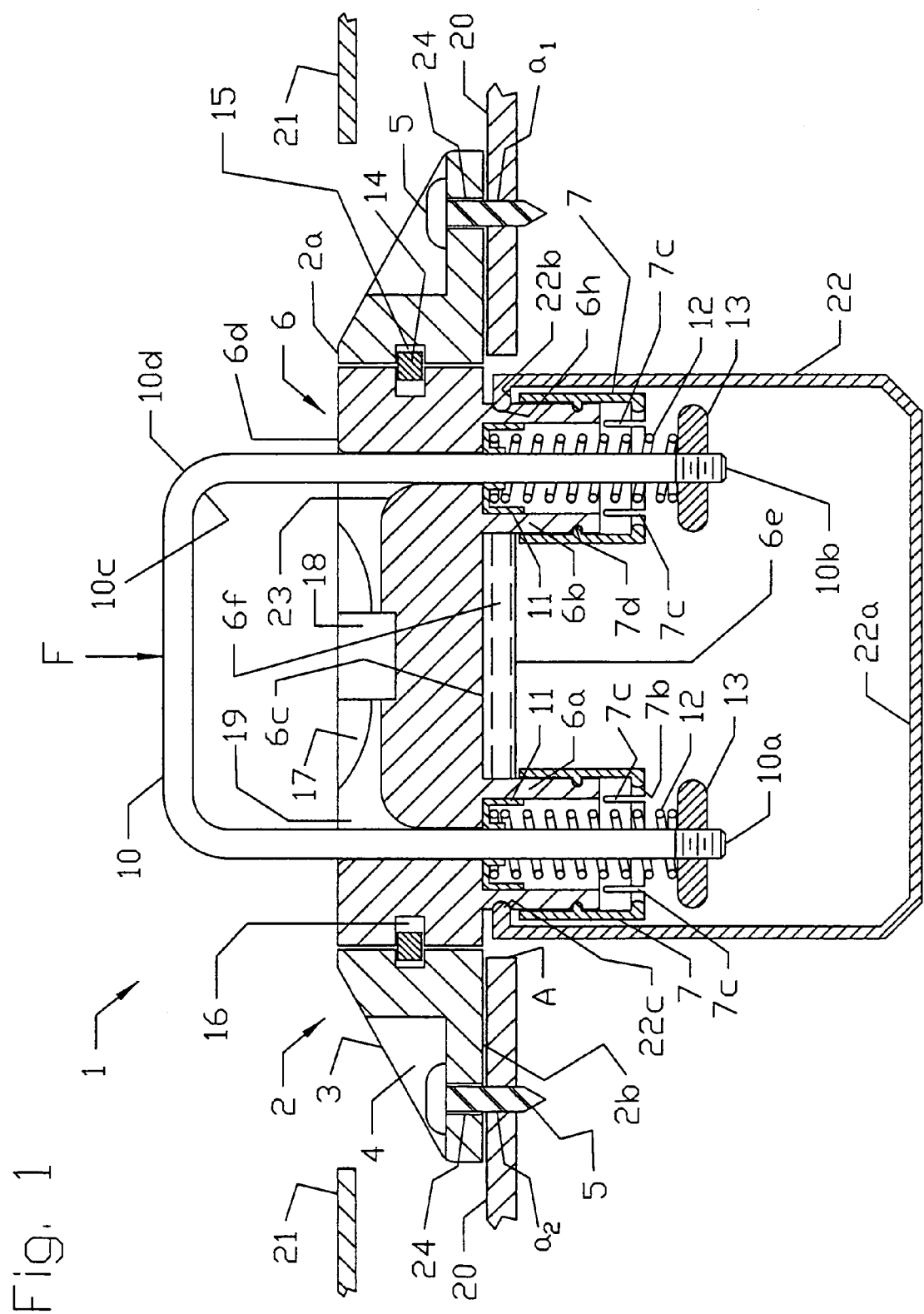
FIG. 1 shows a cross-sectional side view representation of one embodiment of the retractable anchor mounted to the surface of a vehicle having a bed liner. A retractable U-shaped member is seen in an intermediate position between the extended position and the retracted position.

FIG. 1 shows one embodiment of the retractable anchor 1. The anchor 1 includes a U-shaped member 10 that has a first end 10a and a second end 10b. The U-shaped member is made by bending a solid cylindrical rod or bar of metal, such as, e.g., stainless steel or chrome-plated steel. Of course, the invention contemplates that the U-shaped member 10 may be made of any desired material, conventional or otherwise, provided that it is fit for its intended purpose. These materials may include aluminum, titanium, reinforced plastic, or a composite material when the anchor is used in a military or space environment. The U-shaped member 10 may also have any desired cross-sectional shape including cylindrical, oval, square, polygonal, or any combination thereof, etc., and may even be hollow or tubular. The U-shaped member 10 has two bends, with each bend having an internal bend radius 10c is smaller than an outer bend radius 10d. Of course, the U-shaped member 10 may also be formed with only a single large bend, i.e., similar to member 30 of U.S. Pat. No. 5,302,064, the disclosure of which is expressly incorporated by reference in its entirety. The first end 10a has an external threaded end section whose external threads are sized and configured to engage internal threads of a nut 13, whose details will more fully be described later on. The second end 10b similarly has an external threaded end section whose external threads engage internal threads of another nut 13. These threads may range from $\frac{1}{8}$"-44 to $\frac{3}{8}$"-24 for fine threads and between $\frac{1}{8}$"-40 to $\frac{3}{8}$"-16 for course threads, or even larger sizes.

As should be clear from the embodiment shown in FIG. 1, the U-shaped member 10 is movably, i.e., slidably, mounted to a mounting part which includes an inner mounting part 6 and an outer mounting part 2. The inner mounting part 6 has a circular shape and is rotatably disposed within the outer mounting part 2 via a ring 14. Arranged on an outer circumference of the inner mounting part 6 is an outer circumferential groove 16 whose axial width is slightly larger than an axial width of the ring 14. The groove 16 also has a radial depth or width which is equal to or slightly greater than a radial thickness of the ring 14. This radial depth allows the ring 14 to be radially and/or circumferentially compressed within the groove 16 until its outer surface 14a (see FIG. 18) is equal to (or slightly less than) an outer diameter of the inner mounting part 6. This arrangement facilitates installation of the inner mounting part 6, having the ring 14 installed thereon, into the outer mounting part 2. The ring 14 is preferably made of a spring steel type material. Of course, the invention contemplates that the ring 14 may be made of any desired material whether metal, plastic, composite, etc., and whether conventional or otherwise, provided it is fit for its intended purpose. An inner circumferential groove 15 is also arranged on an inner circumference of the outer mounting part 2. Similarly, the inner circumferential groove 15 has an axial width which is slightly larger than an axial width of the ring 14. However, the groove 15 need only have a radial depth which is at least approximately equal to or slightly greater than half of the radial thickness of the ring 14. As a result, when (upon installation) the surface 6d of the inner mounting part 6 is aligned with the surface 2a of the outer mounting part 2, the ring 14 will be allowed to radially and/or circumferentially expand out into groove 15 until its outer surface 14a (see FIG. 18) almost engages a bottom surface (i.e., the outer radial surface) of the groove 15, thereby ensuring that the inner mounting part 6 is axially (but not rotatably) retained relative to the outer mounting part 2. Of course, it should be understood that one can choose the size, shape, design, type, etc, of the ring 14 (as well as that of the grooves 15 and 16) in order to regulate the amount of resistance to rotation and/or the axial play or movement, of the inner mounting part 6 relative to the outer mounting part 2.

Figure 2:
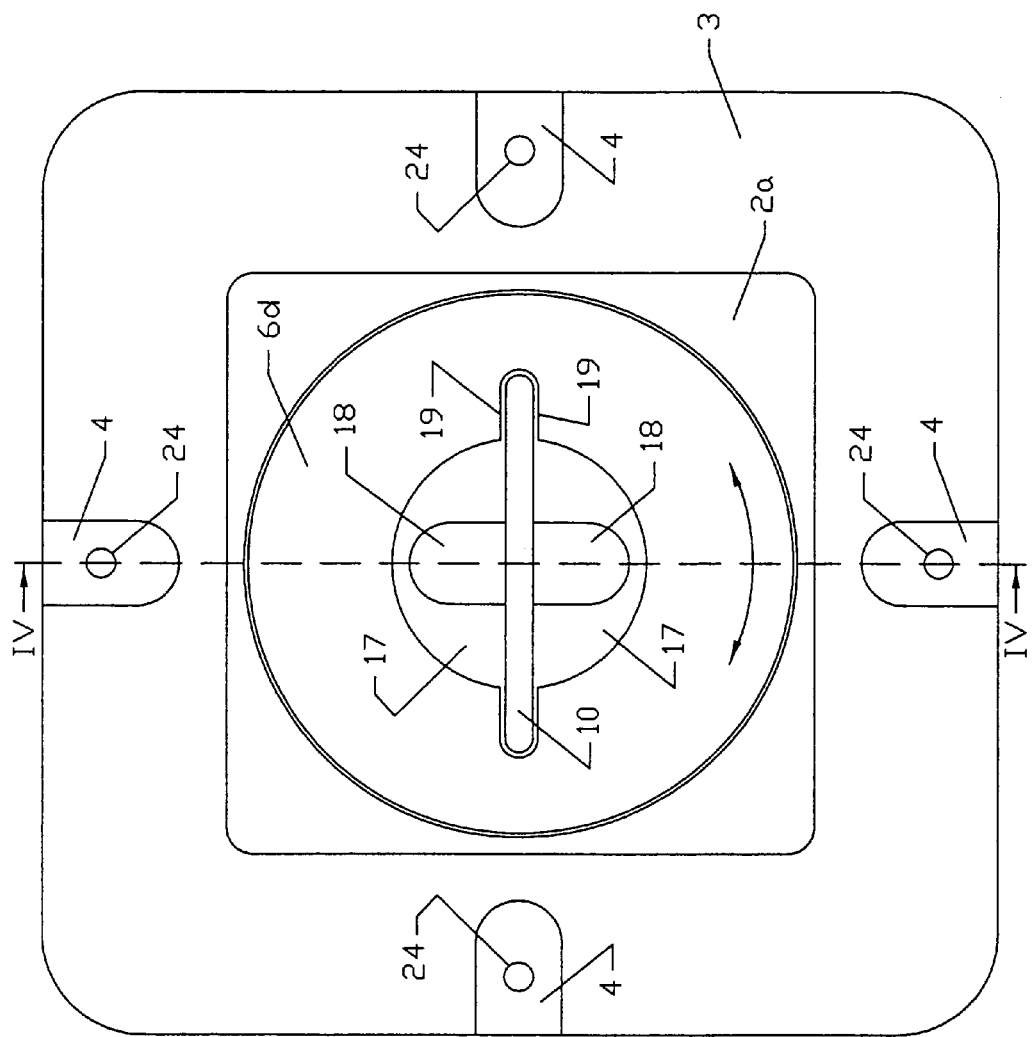
FIG. 2 shows a top view of the embodiment shown in FIG. 1.

As can be seen in FIG. 2, the outer mounting part 2 has a substantially square shape peripheral or outer shape. According to at least one preferred embodiment, the dimension of the square shape is in the range of approximately 1.5 by 1.5 inches to approximately 6 by 6 inches for vehicles ranging from boats, to cars, to Sports Utility Vehicles (SUVs), to trucks. Similar sizes may also be used in military vehicles and space vehicles. Moreover, it should be noted that the invention is not limited to a square shaped outer mounting part 2, and it may advantageously be made to have any desired shape such as, e.g., circular, polygonal, oval, rectangular, etc. The outer mounting part 2 also has four mounting through holes 24 which are each sized to receive a bolt or fastener such as, e.g., a self-threading type screw 5. Of course, other fasteners may also be utilized such as, e.g., rivets. Moreover, it may even be desirable to attach the outer mounting part 2 to a surface 20, either alternatively or additionally, using an attachment technique such as bonding, adhesives, welding, soldering, etc. Nevertheless, it should be noted that the invention is not intended to be limited to the manner in which the mounting parts 2/6 are attached to the surface 20. However, it is preferable that screws 5 used so that the retractable anchor 1 can be made removable, i.e., removably mountable, so that it can be repaired or services. Additionally, the use of screws 5 makes installation of the anchor 1 relatively easy and cost effective, especially in the case where a user decides to install one or more anchors 1 in a non-factory setting, i.e., in the case where a vehicle is retrofitted with one or more retractable anchor devices.

Again, with reference to FIG. 1, it can be seen that the outer mounting part 2 has a tapered surface 3 which extends from a base portion whose lower surface 2b is planar. The planar surface 2b is designed to rest against a mounting surface 20. Although not shown, the invention contemplates the use of gasket or gasket type material between surfaces 2b and 20 in order to provide sealing, dampening, and/or to prevent scratching and/or movement between these surfaces. Four recesses 4 (see also FIG. 2) are provided in the area of the tapered surface 3. The recesses 4 each have a planar bottom surface which is engaged by the heads of the screws 5. These recesses 4 also allow the screw heads to be recessed within the outer mounting part 2. The outer mounting part 2 also has four rounded corners (see FIG. 2) arranged at an outer periphery and further includes a square-shaped planar top surface 2a, which is designed to be aligned with a top surface 6d of the inner mounting part 6. Both the inner mounting part 6 and the outer mounting part 2 may be made of a forged or cast metal such as, e.g., cast iron or cast aluminum. However, other metal materials may also be utilized. Still further, the inner 6 and outer 2 mounting parts may also be made of a reinforced hard plastic or of composites whether reinforced or not, provide the material has sufficient strength to function in the desired environment. In the military or space environment, titanium, aluminum or carbon-fiber materials may be used, since they offer high strength and relatively low weight.

With reference to FIGS. 1–4, it can be seen that the inner mounting part 6 has a bottom surface 6c which is mostly planar and which is configured to be aligned with the bottom surface 2b of the outer mounting part 2. Projecting from the bottom surface 6c is a first cylindrical section 6a and a second cylindrical section 6b. These sections 6a and 6b are formed integrally with the inner mounting part 6 (i.e., made as a one piece structure from the same material). Of course, the sections 6a and 6b may alternatively be made as separate parts and then attached to the inner mounting part 6 (not shown). Each section 6a and 6b has one end which is attached to the surface 6c, another end which forms a rim, a cylindrical outer surface, and a cylindrical inner surface. The rim is sized to engage the nuts 13 when the U-shaped member 10 is pulled in a direction opposite to the force F.

Figure 14A:
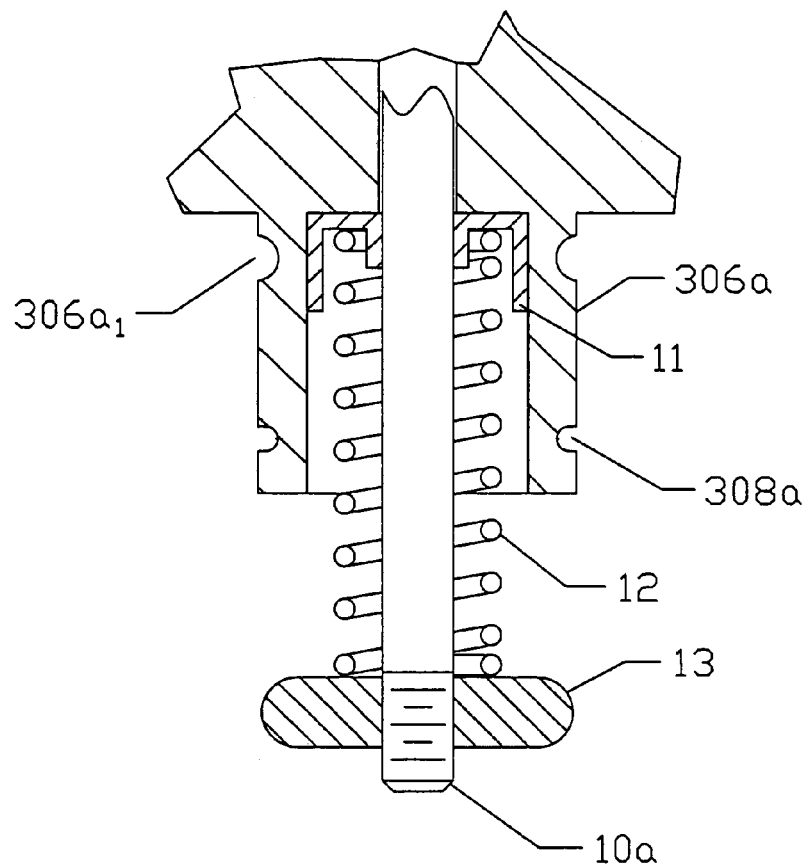
FIGS. 14a–b illustrate how the locking device is installed onto each of the cylindrical sections of the mounting part.

An inner cylindrical opening of each section 6a and 6b is defined by the inner cylindrical surface. As will be described later on, this inner cylindrical opening receives a sealing member 11, a spring 12, and an end 10a or 10b of the U-shaped member 10. The outer cylindrical surface of each section 6a and 6b is configured to retain a cylindrical locking member 7 and a dust housing or dust cover 22. As will be described later on, each locking member 7 is retained on the cylindrical section 6a and 6b via a circumferential groove (e.g., 308a in FIG. 14a).

Figure 3:
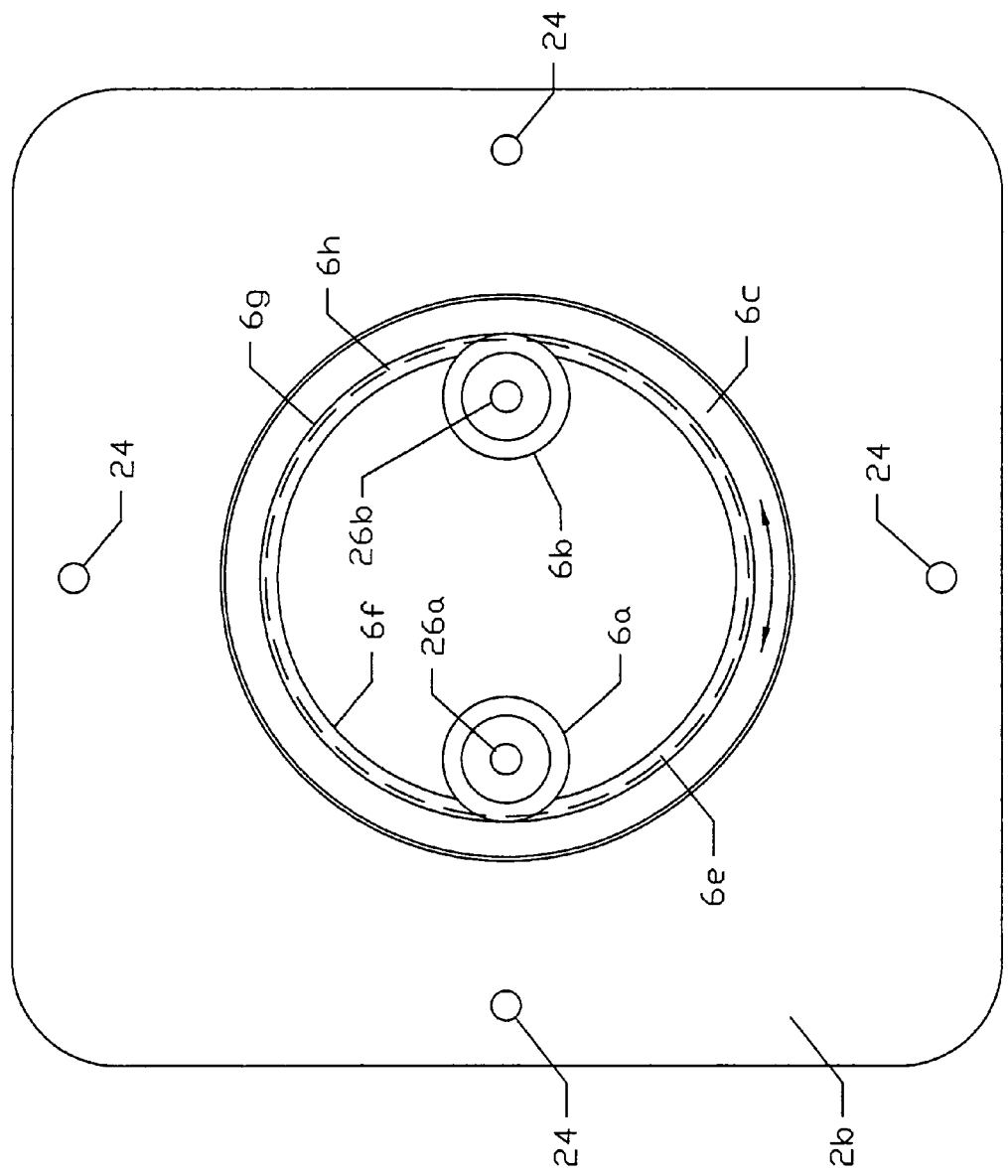
FIG. 3 shows a bottom view of the embodiment shown in FIG. 1. For the sake of clarity, the U-shaped member, nuts, springs, locking devices, seals, and cover have been removed.
Figure 4:
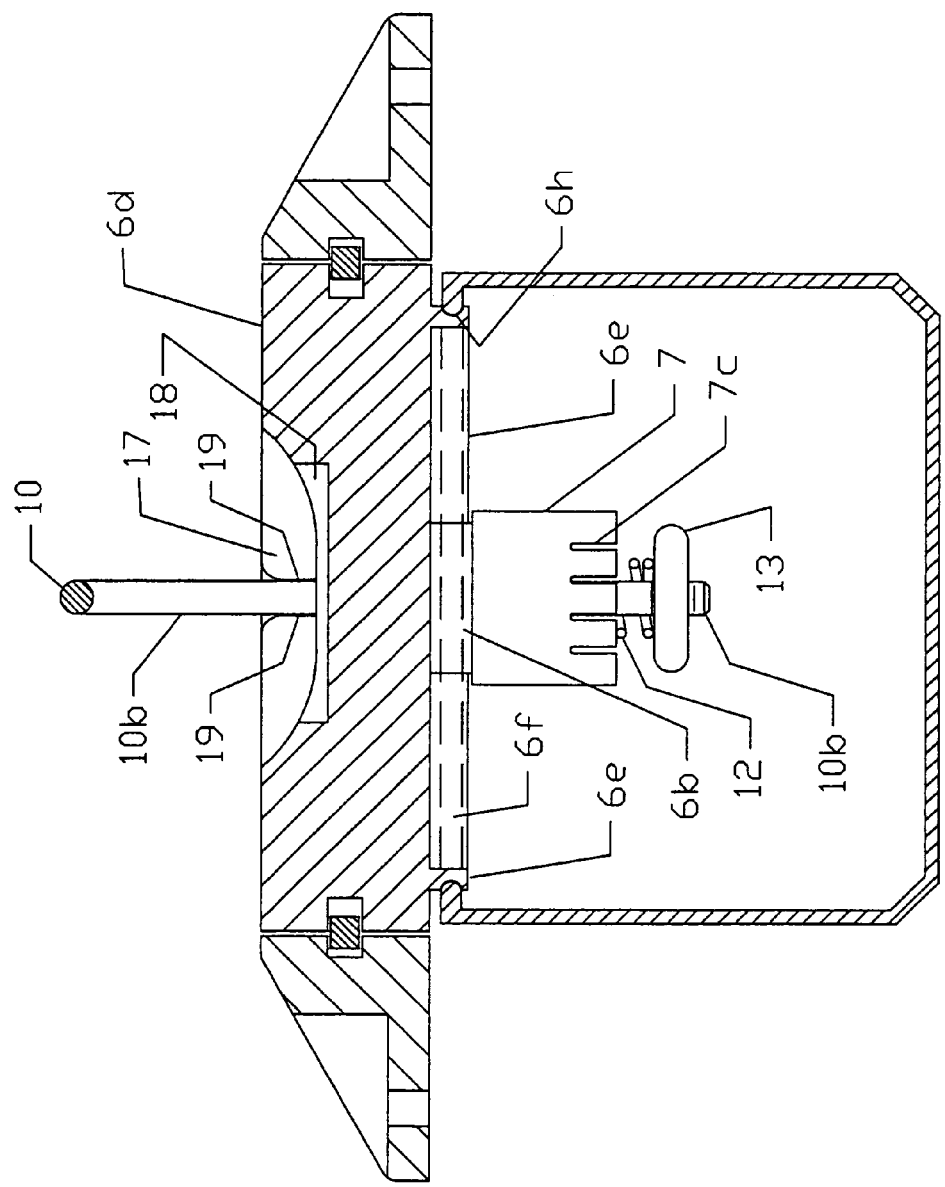
FIG. 4 shows a cross-section of the embodiment shown in FIG. 1 taken from a position perpendicular to the cross-section view shown in FIG. 1.

Also projecting from surface 6c, is a short large diameter cylindrical section (see FIG. 3) which is has one end attached to (i.e., formed integrally with) surface 6c, another end which forms a rim 6e, a cylindrical outer surface 6g, and a cylindrical inner surface 6f. A circumferential concave groove 6h is formed in the cylindrical outer surface 6g. The outer cylindrical surface 6g is also configured to retain the dust housing or dust cover 22 via the groove 6h. As can be seen in FIG. 3, the short large diameter cylindrical section is formed with part of the cylindrical sections 6a and 6b in the area of the cylindrical sections 6a and 6b, i.e., the sections 6a and 6b and the short large diameter cylindrical section are integrally formed with each other. Of course, it could also be otherwise. In this way, the groove 6h will be formed continuous throughout circumferential surface 6g, thereby providing a good sealing surface for the dust cover 22. By way of non-limiting example, the short large diameter cylindrical section may project from the surface 6c in the range of between approximately ⅛ inch to approximately 1 inch, while each cylindrical section 6a and 6b may project from surface 6c between approximately ⅜ inch to approximately 1.5 inches.

The dust cover 22 is a cylindrical shaped housing having a closed end 22a and an open end. A radially inward facing convex projection 22c is located in the area of the rim of the open end. This projection 22c has a rounded or convex end which is sized to engage and/or cooperate with the concave groove 6h in the each of the cylindrical sections 6a and 6b as well as in the short large diameter cylindrical section, i.e., as discussed above, the groove 6h is a continuous groove which completely encircles the short large diameter cylindrical section. As is evident from FIG. 1, the diameter of the groove 6h is sized so that the circular projection 22c tightly engages the groove 6h in order that a good seal is formed between the dust cover 22 and the inner mounting part 6. The projection 22c also has an inner annular shoulder 22b. The dust cover 22 is preferably made of a material such a plastic or other soft or deformable/elastic material so that it can be installed and removed easily. In this way, the projection 22c should be able to elastically radially increase in size and/or diameter when it is slid onto the inner mounting part 6. Preferably the material of the dust cover 22 is such that the projection 22c will snap into the groove 6h, when the dust cover 22 is in its final installation position. Of course, use of this snap connection system or arrangement allows the dust cover 22 to be removed by pulling it in the opposite direction of installation. Such removal of the dust cover 22 will allow access to the back of the inner mounting part 6 and facilitate the servicing of the springs 12, nuts 13, ends 10a and 10b, and locking members 7. Again, it should be noted that the invention is not limited to any particular material, whether conventional or otherwise, for the dust cover 22.

Figure 16:
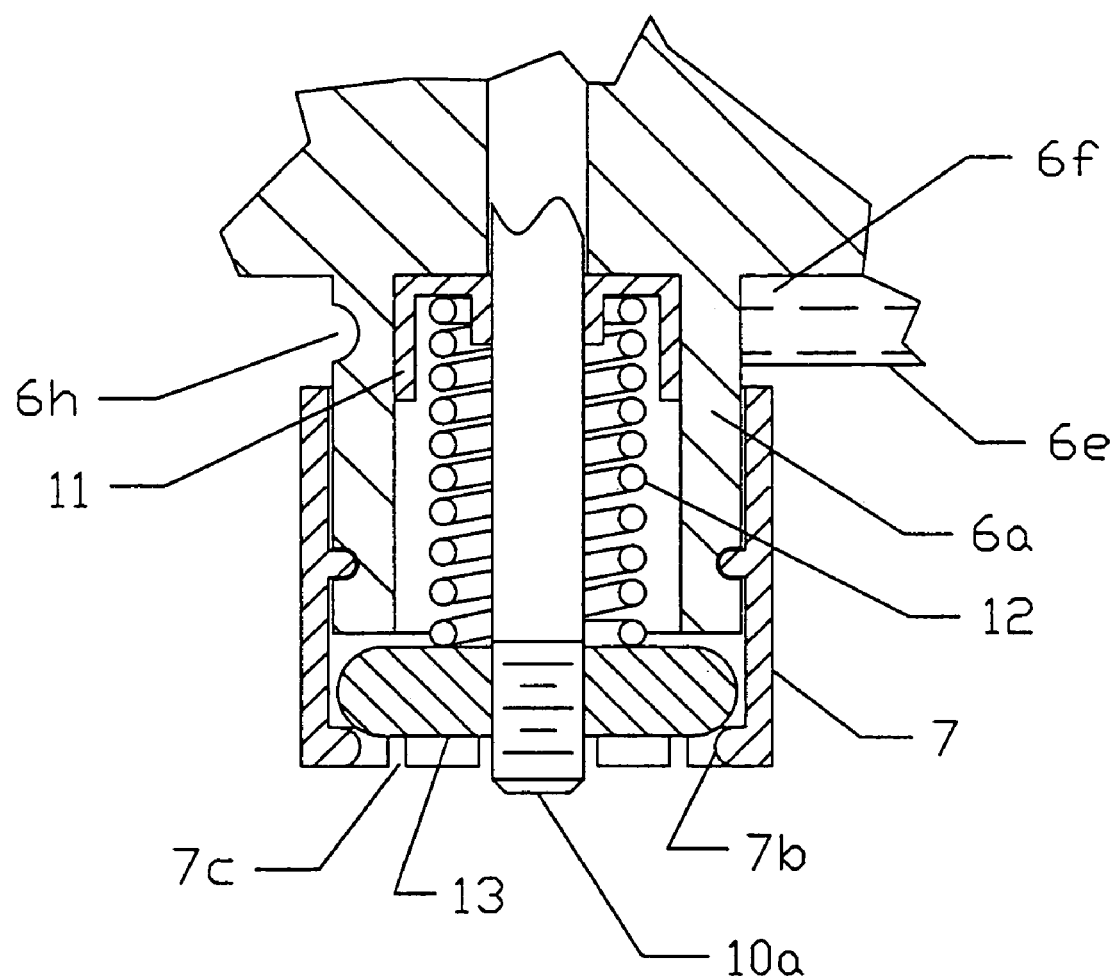
FIG. 16 shows a cross-section enlarged view of the left side cylindrical section and a portion of the mounting part shown in FIGS. 1, 6 and 17. This figure illustrates the locking engagement between the nut with the locking device when the U-shaped member is in the extended position.

As should also be evident from FIGS. 1–4, the U-shaped member 10 is slidable into and out of the inner mounting part 6, between a retracted position (see e.g., FIG. 19) and an extended position (see e.g., FIG. 16). In FIG. 1, the U-shaped member 10 is shown in an intermediate position. However, it should be clear that, in actuality, when the nuts 13 are located outside the locking members 7, the springs 12 will naturally cause the U-shaped member 10 to be in the retracted position (see e.g., FIG. 19). To facilitate movement (i.e., towards the extended position) of the U-shaped member 10 by a user, a finger gripping indentation or recess 18 is provided on each side of the U-shaped member 10. As can be seen in FIG. 2, the width of the groove 18 corresponds approximately to the width of the average finger of a user, e.g., approximately ½ inch wide. As is evident from FIG. 2, each groove 18 also has a rounded outer end and a flat or planar bottom surface (see FIG. 1). A curved recess 17 (see FIGS. 1 and 4) is also provided one each side of the U-shaped member 10. These curved recesses 17 also make it easier for a user to grip the U-shaped member 10. Another recess 19 is formed in the inner mounting part 6. As can be seen in FIG. 2, this recess 19 has parallel walls which are separated by a space which is slightly wider than a diameter or width of the U-shaped member 10 so as to be sized to receive the U-shaped member 10. In FIG. 2 it can be seen that the inner mounting part 6 also includes a first cylindrical through opening 26a and a second cylindrical through opening 26b. The first cylindrical opening 26a extends from the recess 19 to the surface 6c and is sized to receive the first end 10a of the U-shaped member 10. The second cylindrical opening 26b extends from the recess 19 to the surface 6c and is sized to receive the second end 10b of the U-shaped member 10. Although not shown, these openings may use bushings which allow ends 10a and 10b to smoothly slide in and out of the inner mounting part 6. As can also be seen in FIG. 1, the groove 19 has a curved or concave bottom surface and two rounded bottom corners 23. The radius of each of these corners 23 is approximately equal to or less than each inner radius 10c of the U-shaped member 10.

Figure 5:
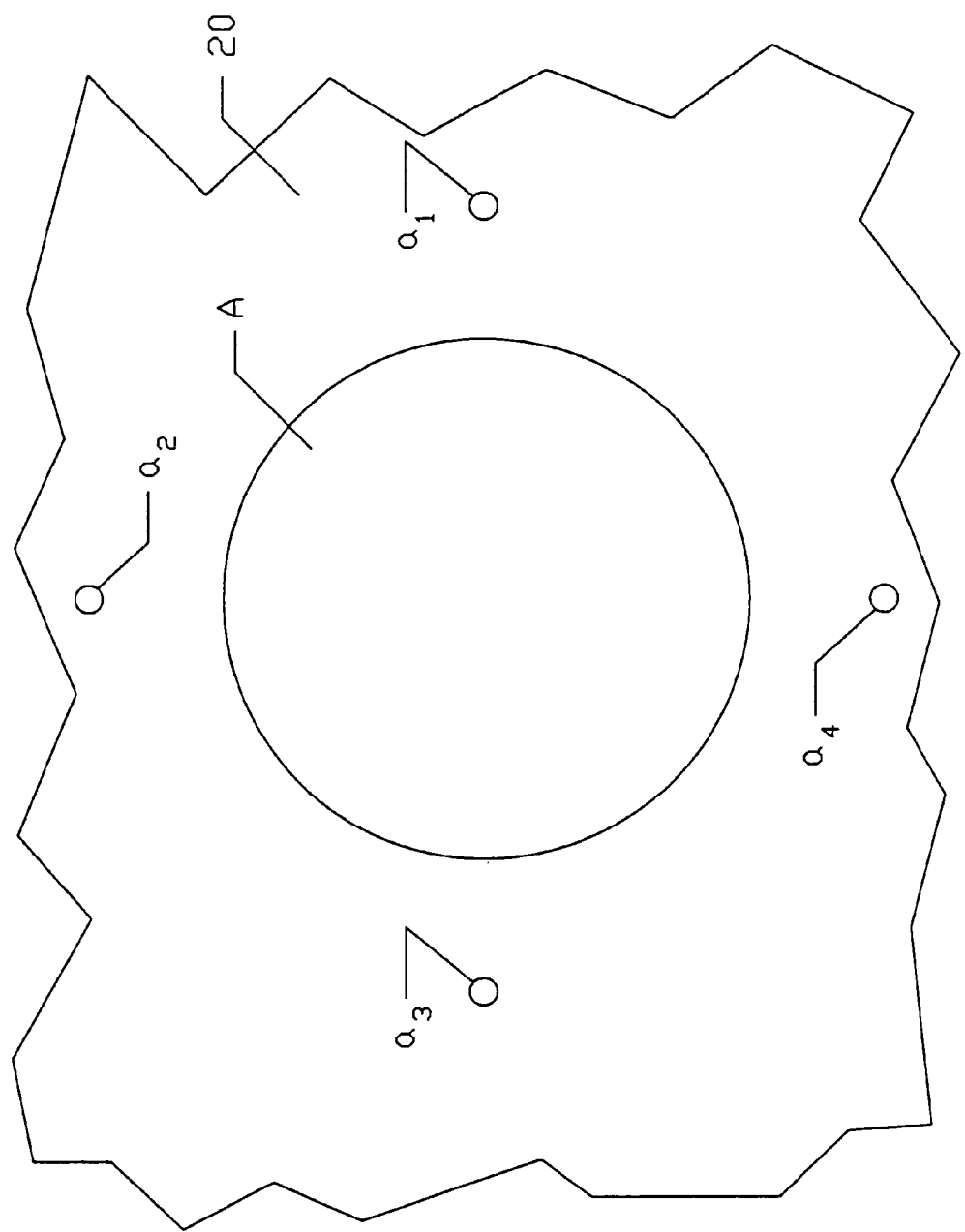
FIG. 5 shows a hole pattern required to mount the embodiment of FIG. 1 on a surface.

FIG. 1 also illustrates one way that the retractable anchor 1 may be installed. The particular installation requires that a square shaped opening (of a size slightly larger than the outer mounting part 2) be formed in the bed liner 21 (or other external plastic covering materials in the case of installation inside a vehicle). Next, a large circular opening A is made in the metal sheet or plate 20 of the vehicle body. The opening A should be large enough to accept the dust cover 22 with some small clearance. Finally, the anchor 1 is installed into the opening A (dust cover first) and the holes 24 of the outer mounting part 2 are used as a template for forming the fastener holes a1–a4. FIG. 5 shows the hole pattern in the sheet 20 which may be used in the installation of the anchor shown in FIG. 1.

With reference to FIG. 5, it can be seen how the surface 20 may be prepared for receiving the retractable anchor 1. As discussed above, first a square shaped opening (of a size slightly larger than the outer mounting part 2) be formed in the bed liner 21 (or other external plastic covering materials in the case of installation inside a vehicle). It should noted that this opening in the liner 21 may also be of an oval shape, circular, polygonal or rectangular shape, consistent with the shape of the mounting part 2. Next, a large circular opening A is made in the metal sheet or plate 20 of the vehicle body. This opening A can be cut with a recriprocating saw or drilled with a drilling device such as, e.g., a drill. The size of the circular opening A can be in the range of approximately 1 inch (for very small anchor devices) to approximately 6 inches or more for very large anchor devices. Of course, the opening A should be large enough to accept the dust cover 22 with some small clearance. Next, the through holes a1–a4 are drilled to a size which will accept the screws 5. To facilitate the correct position or location of these holes, a template (in the form of, e.g., an adhesive label), may be applied to the surface 20, as is conventionally known. Alternatively, the anchor 1 is installed into the opening A (dust cover first) and the holes 24 of the outer mounting part 2 are used as a template for forming the fastener holes a1–a4. The holes a1–a4 may then be tapped to have the same threads as those of the screws 5. Of course, this additional step would not be required if the screws 5 are of the self tapping (i.e., self-threading) type. In the final step, any burrs are removed from the holes a1–a4 and opening A using a file or a deburing tool.

The functioning of the retractable anchor 1 shown in FIGS. 1–4 will now be described. As discussed above, the U-shaped member 10 is configured to be position in either of two positions. A retracted position is one in which the connecting portion of the U-shaped member 10 is substantially entirely positioned within recess 19 (see e.g., FIG. 19). In this position, the U-shaped member 10 will not substantially protrude from surface 6d. This occurs when the nuts 13 are not being retained by the locking members 7. In such case, the springs 12, which are always exerting a continuous biasing force against the nuts 13, biases the nuts 13 away from surface 6c. On the other hand, an extended position is one in which the nuts 13 are retained between the rim of the cylindrical sections 6a and 6b and the internal projections 7b of the locking members 7 (see e.g., FIG. 16). Thus, the extended position is characterized by the nuts 13 being trapped by the locking members 7. Moreover, in the extended position, the nuts 13 compress the springs 12 between the nuts 13 and the surface 6c. Of course, it should be evident that even in this position, the springs 12 continue to exert a continuous force on the nuts 13, i.e., biasing the nuts 13 away from surface 6c. Because of the nuts 13 are locked in the locking members 7 and simultaneously biased away from surface 6c, the exertion of a force F equal to or greater than a predetermined amount, i.e., sufficient to overcome the frictional engagement between the nuts 13 and the locking members 7, will naturally cause the U-shaped member 10 to automatically retract. In this way, if the anchor 1 is inadvertently left in the extended position, and a user accidentally contacts the U-shaped member 10, he or she will not be injured by such contact because the U-shaped member 10, instead of being fixed in an extended position, will automatically retract due to such contact. In this regard, the frictional engagement force between the locking members 7 and the nuts 10 can be set or predetermined, and may even be made adjustable by switching the locking members 7. In this regard, the force necessary for causing the U-shaped member 10 to snap out of the extended position may be in the range of between approximately a few ounces to 5 lbs or more, depending the particular application.

Figure 6:
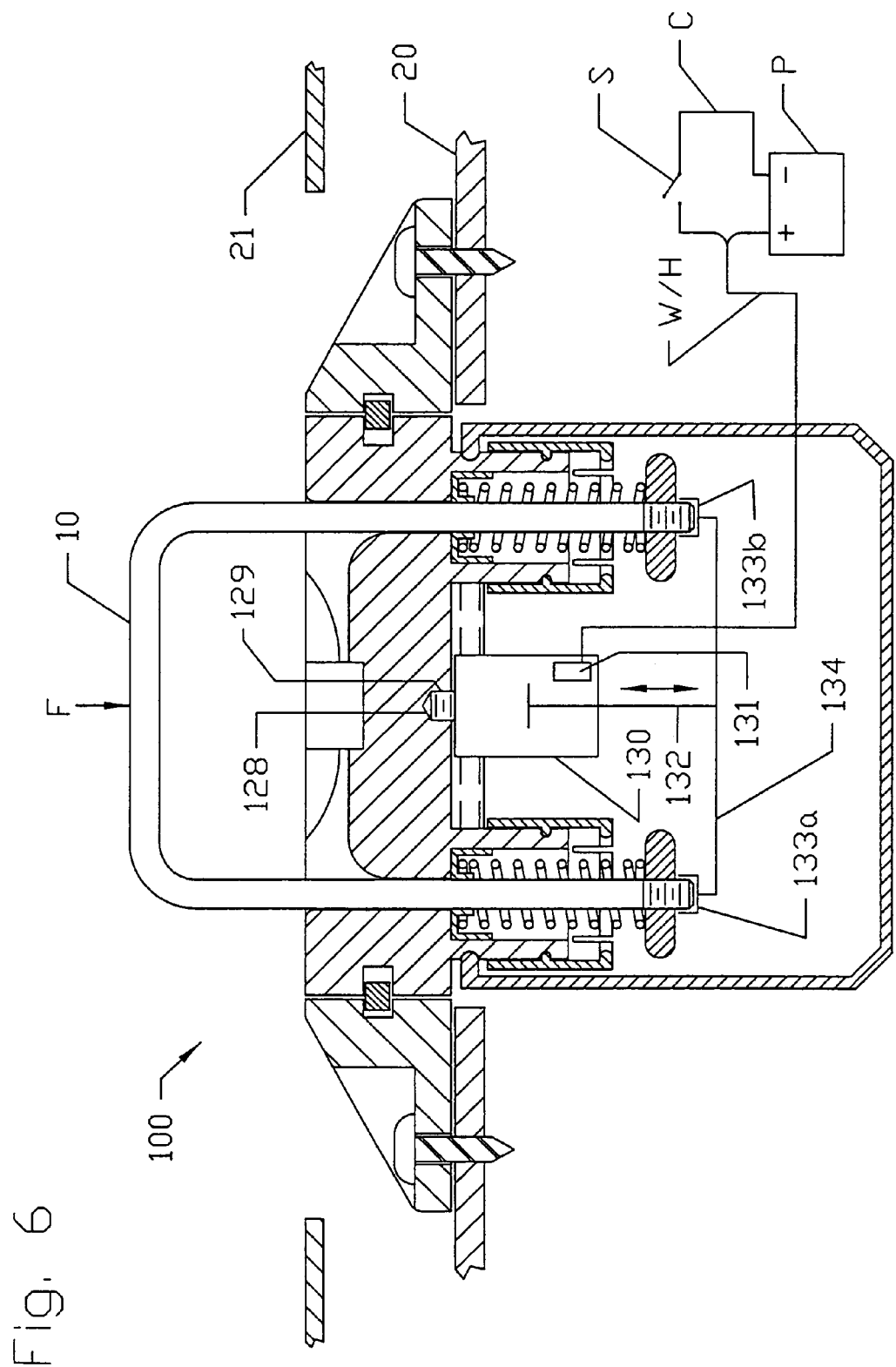
FIG. 6 shows a cross-sectional side view representation of another embodiment of the retractable anchor mounted to the surface of a vehicle having a bed liner. A retractable U-shaped member is again seen in an intermediate position between the extended position and the retracted position. This embodiment differs from that shown in FIG. 1 mainly with regard to its use of an actuator system to move the U-shaped member.
Figure 7:
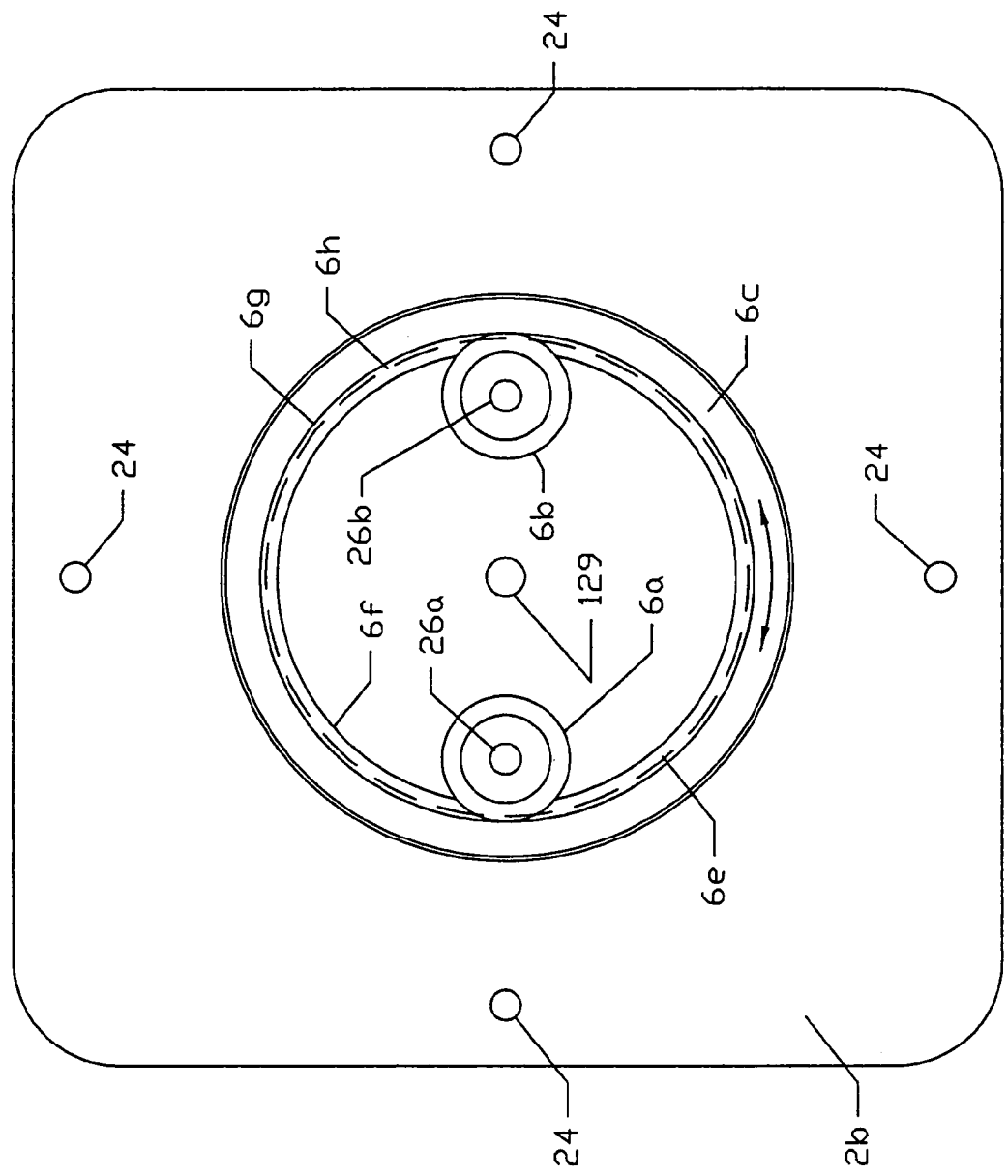
FIG. 7 shows a bottom view of the embodiment shown in FIG. 6. For the sake of clarity, the U-shaped member, nuts, springs, locking devices, seals, actuator system, and cover have been removed.

FIGS. 6 and 7 show another embodiment of the retractable anchor 100. The anchor 100 includes most of the features described in FIGS. 1–4 (accordingly they will not be described again) and additionally utilizes an activation or actuator system. As can be seen, the U-shaped member 10 has a first end 10a and a second end 10b, just like the one in FIG. 1. The activation system has an actuator 130 which has one end whose externally threaded portion 128 is removably secured to the surface 6c via an internally threaded opening 129 formed in the inner mounting part 6. Protruding from the other end of the actuator 130 is a movable member 132 (this movement being indicated by the arrows). The other end of the movable member 132 is coupled to a connecting member 134 which has a first end 133a coupled to the first end 10a of the U-shaped member 10 and a second end 133b coupled to the second end 10b of the U-shaped member 10. The actuator 130 shown is of the electrical or solenoid pull and/or push type (or both) and devices such as these are conventionally known and available. Connected to the actuator 130 is wire harness W/H which connects the actuator 130 to a circuit C having a power source P and a switch S. The power source P may be the battery of a vehicle, e.g., a 12 volt battery. The switch S may be mounted in the control panel of the vehicle (e.g., in the vicinity of the dash board) or it may be installed near or on the inner or outer mounting parts 6 and 2 (not shown). The system also utilizes a conventional (or otherwise) force or load sensing device 131 which causes the actuator 130 to move the U-shaped member 10 to retract upon sensing a predetermined force F tending to push the U-shaped member 10 towards the retracted position. Although FIG. 6 shows the U-shaped member 10 in an intermediate position, it should be apparent that the actuator 130 is capable of moving the U-shaped member from the retracted position (see e.g., FIG. 19) to an extended position (see e.g., FIG. 16), or it may be used for moving the U-shaped member 10 toward an extended position.

According to this embodiment, the actuator 130 and locking members 7 work together to lock the U-shaped member 10 in the extended position. In this regard, when the actuator 130 is in a mode wherein it is not energized with power P, the locking members 7 act to allow the U-shaped member 10 automatically retract upon exertion of a predetermined force F. In this regard, the force F necessary for causing the U-shaped member to snap out (or to activate the load sensing device) of the extended position may be in the range of between approximately a few ounces to 5 lbs or more depending the particular application. On the other hand, when energized, the actuator 130 may also be capable of overcoming the force of the locking members 7 so as to move the U-shaped member to the retracted position upon activation of the switch S. Although not shown in detail, the switch S may be simple on/off switch in which open position is characterized by the actuator 130 being in an extended position or vise versa. In the closed position, the actuator 130 may be characterized by the actuator 130 being in a retracted position or vise versa. Alternatively, the switch S may be of a three position type with a first position being characterized by the actuator 130 being in the extended position, the second position being open or neutral, and the third position being characterized by the actuator 130 being in the retracted position. It should be noted that while the invention specifically describes an electrical type actuator 130, other actuators may also be utilized without leaving the scope of the invention, such as e.g., hydraulic, pneumatic, etc. The invention also contemplates that the actuator 130 can be radio controlled. In this way, a user can activate the actuator 130 by pushing a button of a transmitter (not shown). A receiver (not shown) may be coupled to the circuit C, as is conventionally known.

Figure 8:
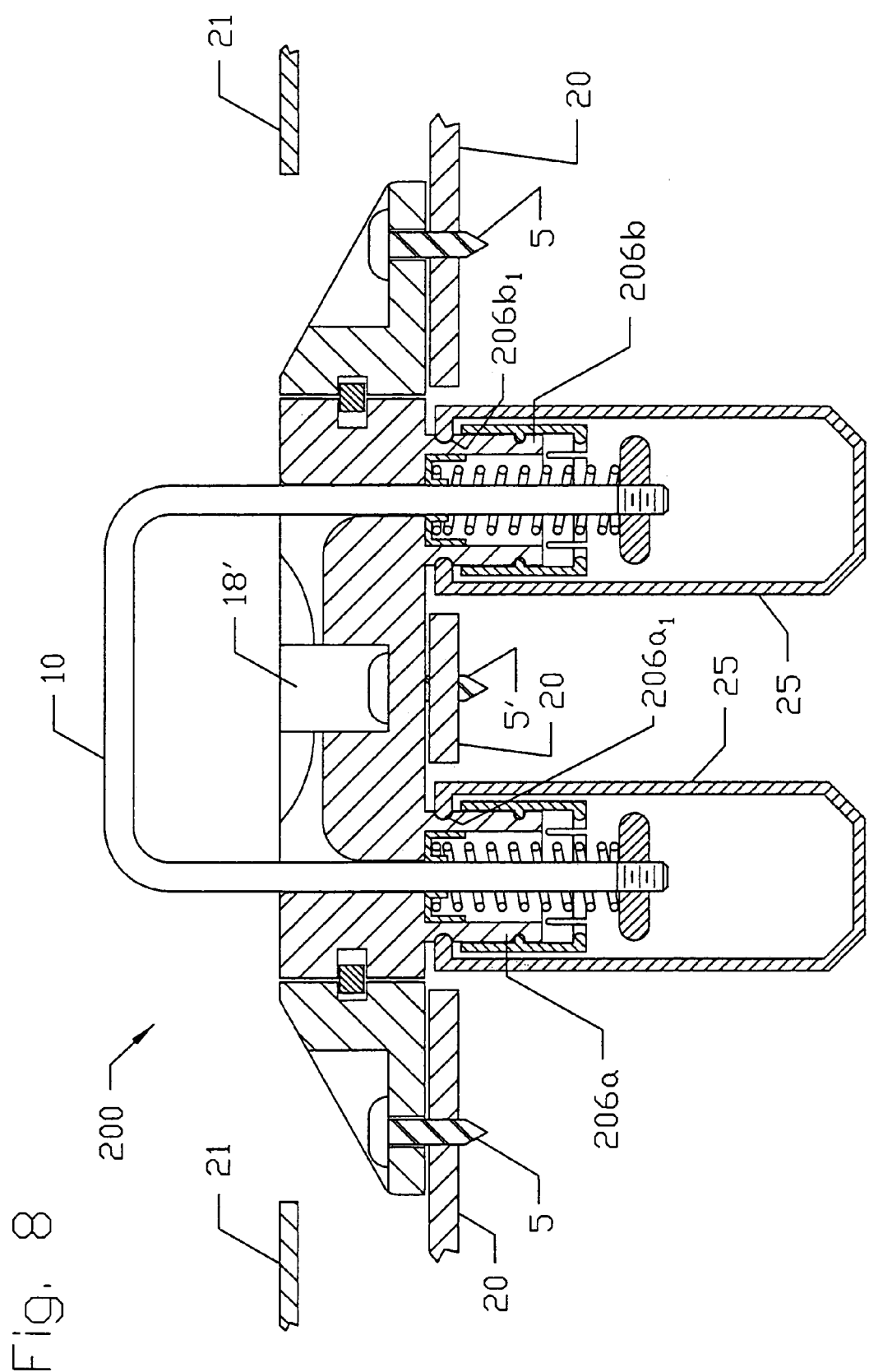
FIG. 8 shows a cross-sectional side view representation of still another embodiment of the retractable anchor mounted to the surface of a vehicle having a bed liner. A retractable U-shaped member is again seen in an intermediate position between the extended position and the retracted position. This embodiment differs from that shown in FIG. 1 mainly with regard to its use of two smaller covers in place of a single cover for preventing debris from contacting the ends of the U-shaped member.

FIG. 8 shows another embodiment of the retractable anchor 200. The anchor 200 includes most of the features described in FIGS. 1–4 (accordingly they will not be described again), except that it uses two individual dust covers 25 instead of a single dust cover. As a result, this embodiment also dispense with the short large diameter cylindrical section. Additionally, this arrangement allows the anchor 200 to be fastened by two additional center fasteners 5'. The groove 18' and fastener holes would have an arrangement similar to that shown in e.g., FIG. 10, except that it would be square shaped instead of being rectangular. This arrangement also allows for a different hole mounting pattern similar to that shown in FIG. 12 (i.e., two small diameter circular openings A' and A" are provided for receiving the two dust covers 25), except that holes a11 and a13 would be spaced apart from each other by an amount equal to the spacing between holes a11 and a12.

Each dust cover 25 is a cylindrical shaped housing having a closed end and an open end. A radially inward facing projection 25c (see FIG. 15) is located in the area of the rim of the open end. This projection 25c has a convex or rounded end which is sized to engage the groove 206a1 and 206b1 (similar to grooves 306a1 and 306b1) in the each of the cylindrical sections 206a and 206b. As is evident from FIG. 8, the diameter of the grooves 206a1 and 206b1 are sized so that the circular projection 25c tightly engages the groove so that a good seal is provided between the dust covers 25 and each cylindrical section 206a and 206b. The projection 25c also has an inner annular shoulder 25b. The dust covers 25 are preferably made of a material such a plastic or other soft or deformable/elastic material so that they can be installed easily. In this way, the projection 25c should be able to increase in size and/or diameter when it is slid onto the cylindrical sections 206a and 206b. Preferably the material of the dust cover 25 is such that the projection 25c will snap into the groove when the dust cover 25 is in its final installation position. Of course, use of this snap connection system or arrangement allows the dust covers 25 to be removed by pulling them in the opposite direction of installation. Such removal of the dust covers 25 will allow access to the back of each cylindrical section 206a or 206b and facilitate the servicing of the springs 12, nuts 13, ends 10a and 10b, and locking members 7.

Figure 9:
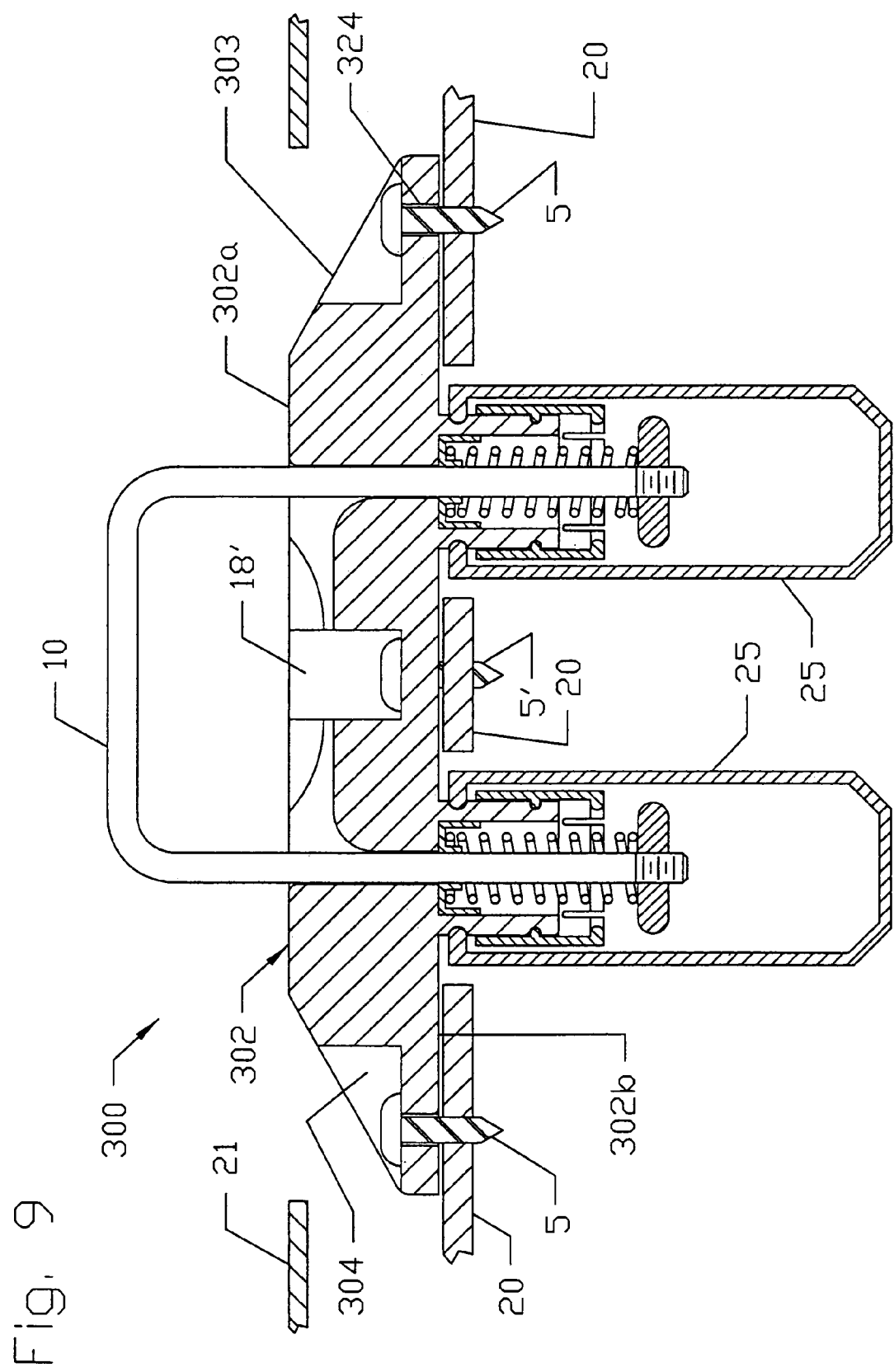
FIG. 9 shows a cross-sectional side view representation of still another embodiment of the retractable anchor mounted to the surface of a vehicle having a bed liner. A retractable U-shaped member is again seen in an intermediate position between the extended position and the retracted position. This embodiment differs from that shown in FIG. 8 mainly with regard to its use of a one piece (i.e., an integrally formed) rectangular shaped mounting part.
Figure 10:
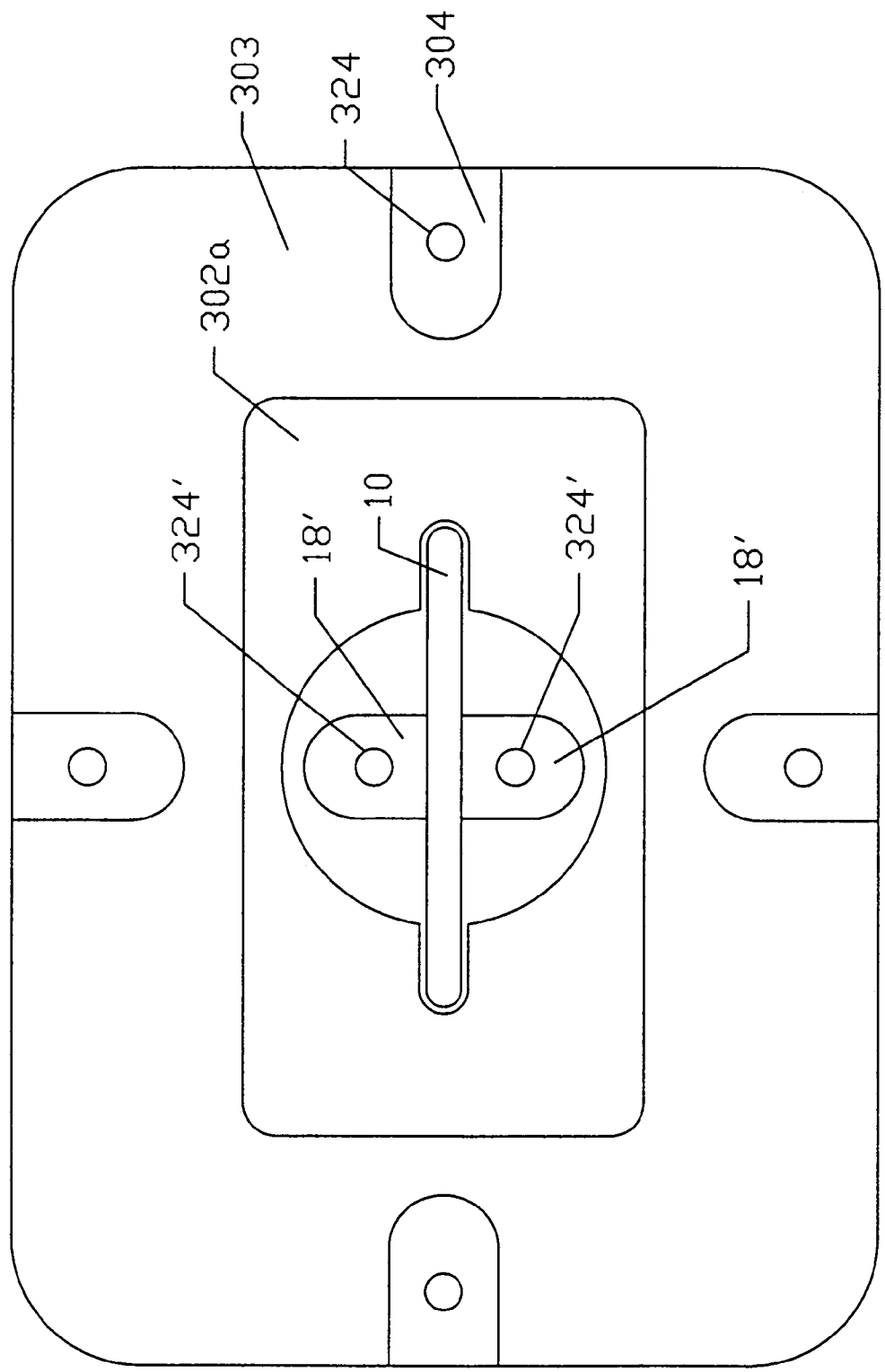
FIG. 10 shows a top view of the embodiment shown in FIG. 9.
Figure 11:
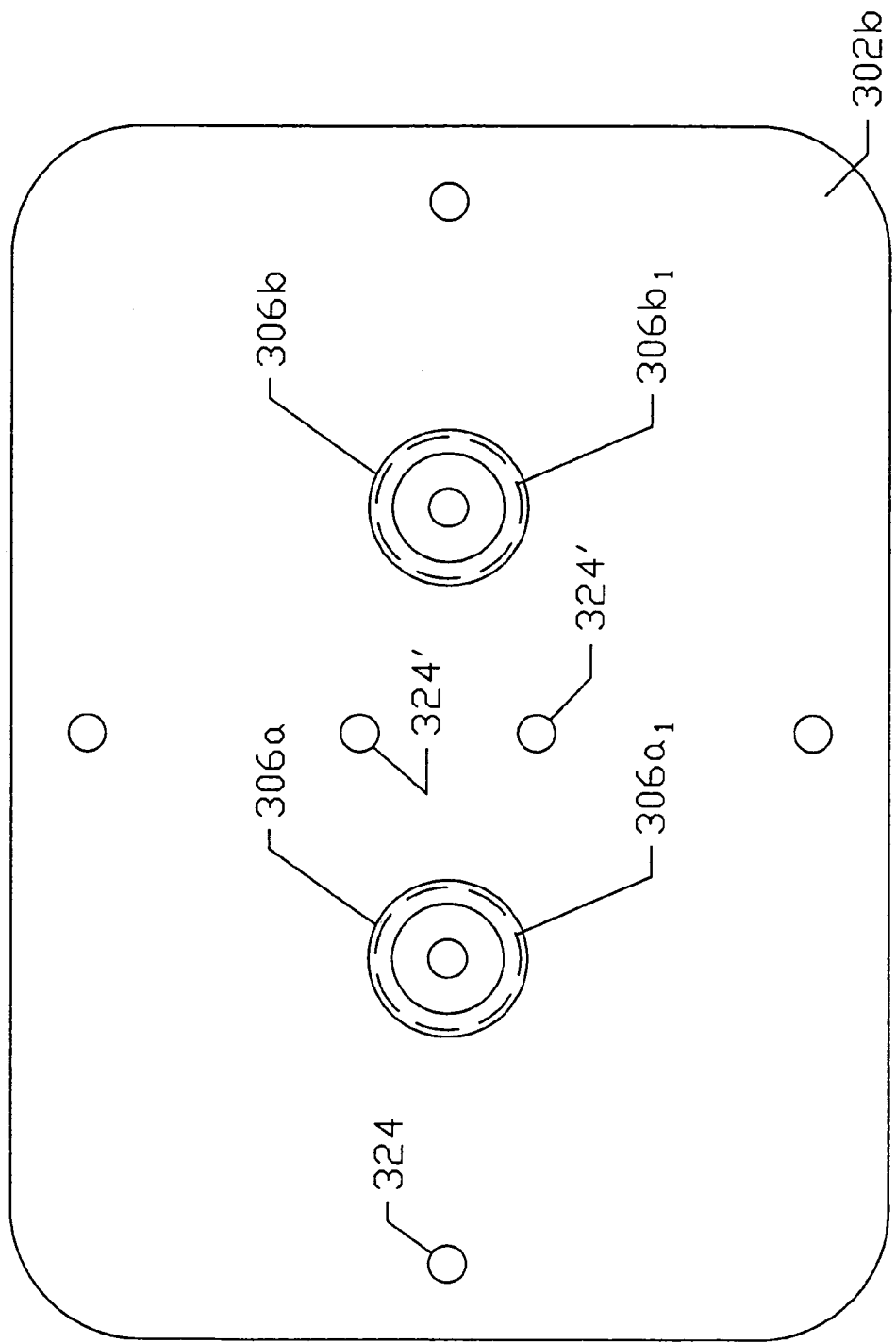
FIG. 11 shows a bottom view of the embodiment shown in FIG. 9. For the sake of clarity, the U-shaped member, nuts, springs, locking devices, seals, and covers have been removed.

FIGS. 9–11 show another embodiment of the retractable anchor 300. The anchor 300 includes most of the features described in FIG. 8 (accordingly they will not be described again), except that it uses a one-piece mounting part 302 instead of two piece (i.e., distinct and/or separate inner and outer mounting parts are not utilized). Additionally, this arrangement allows the anchor 300 to be made smaller, e.g., a rectangular foot print instead of round or square mounting foot print. The mounting part 302 has an upper rectangular shaped surface 302a, tapered portions 303 and four fastener recesses 304. The mounting part 302 also has four outer fastener holes 324 and two inner fastener holes 324'. This anchor 300 can be mounted to surface 20 via the hole pattern shown in FIG. 12.

Figure 12:
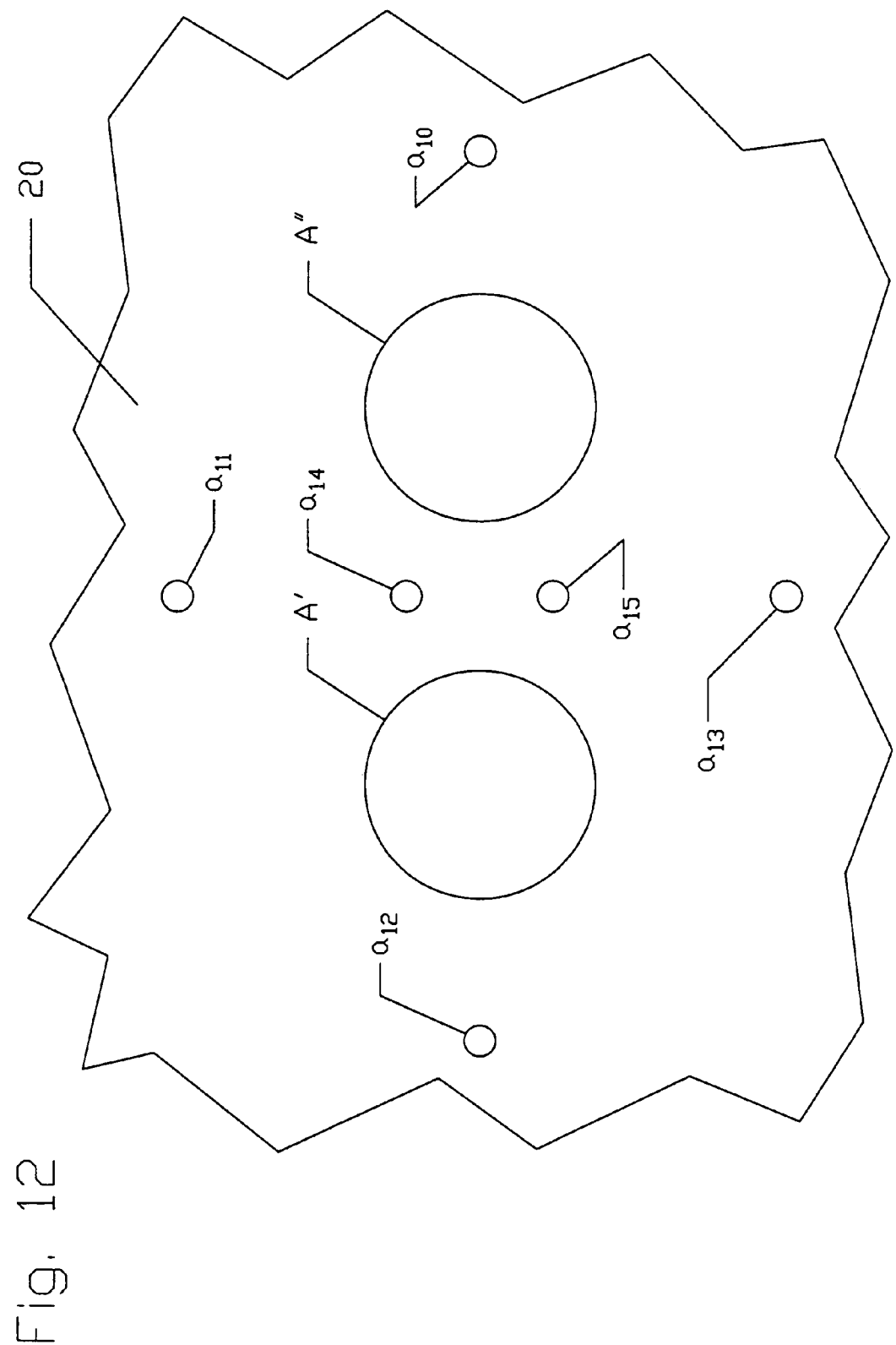
FIG. 12 shows a hole pattern required to mount the embodiment of FIG. 9 on a surface.
Figure 13A:
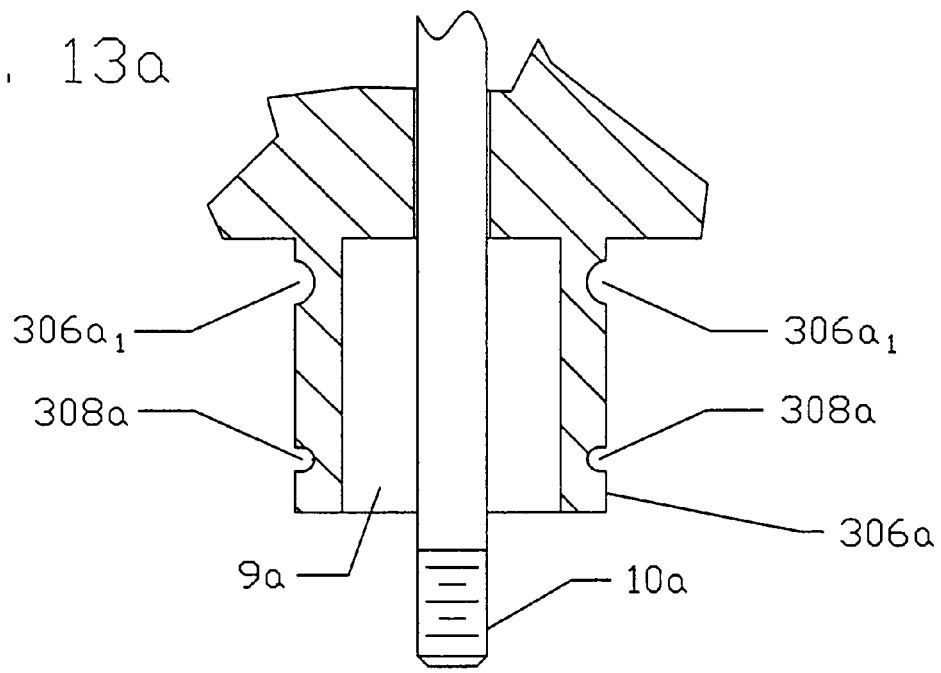
FIGS. 13a–d illustrate how the seal, spring and nut are installed onto the ends of the U-shaped member.
Figure 13B:
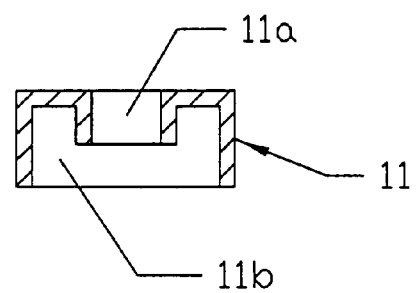
Figure 13C:
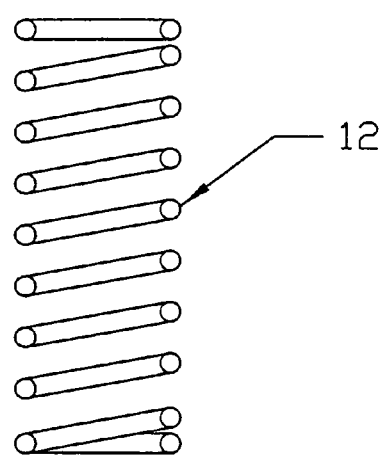
Figure 13D:
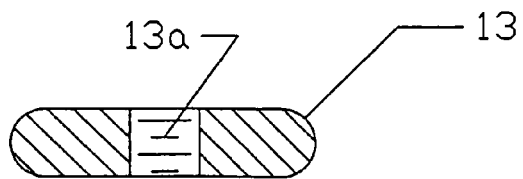

With reference to FIG. 12, it can be seen how the surface 20 may be prepared for receiving the retractable anchor 300. As discussed above, first a rectangular shaped opening (of a size slightly larger than the outer mounting part 2) be formed in the bed liner 21 (or other external plastic covering materials in the case of installation inside a vehicle). It should noted that this opening in the liner 21 may also be of an oval shape, circular, polygonal or rectangular shape, consistent with the shape of the mounting part 302. Next, two large circular openings A' and A" are made in the metal sheet or plate 20 of the vehicle body. These openings A' and A" can be cut with a reciprocating saw or drilled with a drilling device such as, e.g., a drill. The size of the circular openings A' and A" can be in the range of approximately ½ inch (for very small anchor devices) to approximately 2 inches or more for very large anchor devices. Of course, the openings A' and A" should be large enough to accept the dust cover 25 with some small clearance. Next, the through holes a10–a15 are drilled to a size which will accept the screws 5. To facilitate the correct position or location of these holes, a template (in the form of, e.g., an adhesive label), may be applied to the surface 20, as is conventionally known.

Alternatively, the anchor 300 is installed into the openings A' and A" (dust covers first) and the holes 324 of the outer mounting part 302 are used as a template for forming the fastener holes a10–a15. The holes a10–a15 may then be tapped to have the same threads as those of the screws 5. Of course, this additional step would not be required if the screws 5 are of the self tapping (i.e., self-threading) type. In the final step, any burrs are removed from the holes a10–a15 and openings A' and A" using a file or a deburing tool.

In a manner similar to that shown in FIG. 8, each dust cover 25 is a cylindrical shaped housing having a closed end and an open end. A radially inward facing projection 25c (see FIG. 15) is located in the area of the rim of the open end. This projection 25c has a rounded or convex end which is sized to engage a correspondingly shaped concave groove 306a1 or 306b1 in the each of the cylindrical sections 306a and 306b. As is evident from FIG. 9, the diameter of the grooves 306a1 and 306b1 are sized so that the circular projection 25c tightly engages the grooves 306a1 and 306b1 so that a good seal is provided between the dust covers 25 and each cylindrical sections 306a and 306b. The projection 25c also has an inner annular shoulder 25b. The dust covers 25 are preferably made of a material such a plastic or other soft or deformable/elastic material so that they can be installed and removed easily. In this way, the projection 25c should be able to elastically radially increase in size and/or diameter when it is slid onto the cylindrical sections 306a and 306b. Preferably the material of the dust cover 25 is such that the projection 25c will snap into the groove when the dust cover 25 is in its final installation position. Of course, use of this snap connection system or arrangement allows the dust covers 25 to be removed by pulling them in the opposite direction of installation. Such removal of the dust covers 25 will allow access to the back of each cylindrical section 306a or 306b and facilitate the servicing of the springs 12, nuts 13, ends 10a and 10b, and locking members 7.

With reference to FIGS. 13a–13d, it can be seen how each end of the U-shaped member 10 is mounted to the mounting part 6 or 302. First, the ends 10a and 10b of the U-shaped member 10 are slid into the openings 26a and 26b from the upper side of the mounting part. Once the ends 10a and 10b protrude past the rim of the cylindrical sections 6a and 6b (or 206a and 206b or 306a and 306b), a seal 11 may be slid onto the each end 10a or 10b. As should be evident, the seal 11 has a cylindrically shaped outer surface which snugly engages inner cylindrical opening 9a and 9b (only opening 9a is shown). A centrally disposed opening 11a is provided in the seal 11 so as to snugly engage the outer cylindrical surface of each end 10a and 10b. The seal 11 also has a annular recess area 11b which is sized to receive an end of the spring 12. The seal 11 is preferably made of an elastomer or a soft plastic. Alternative, the seal 11 can be made of another material such as a composite. The spring 12 is a wire type metal compression spring and also slides onto and over each ends 10a and 10b. Finally, a nut 13 having internal threads 13a and an outer rounded or convex circumferential surface is used. The internal threads 13a are configured to threadably engage the external threads of the ends 10a and 10b. The outer circumferential convex surface has a diameter which is larger than opening 9a so that the nut 13 will engage the rim of the cylindrical sections 6a and 6b (or 206a and 206b and 306a and 306b). In this way, the U-shaped member 10 will be prevented from pulling out of the mounting part. Accordingly, the preferred material for the nut 13 is a metal such as hardened steel. Although not shown, the nuts 13 may include a thread locking mechanism which prevents the nuts 13 from backing off or unthreading from ends 10a and 10b, after they are installed thereon. Further, the outer circumferential convex surface of the nut 13 is larger than an inner diameter of the projection 7b of the locking part 7, as will be more fully described later on.

The cylindrical sections 6a and 6b (or 206a and 206b and 306a and 306b) also each include a concave circumferential locking member groove 308a. This groove 308a is sized to accept an internal cylindrical convex projection 7d of the locking member 7. A spring 12 of the wire compression spring type is also used. The spring 12 is preferably made of spring steel (although other materials are contemplated) and has one end which fits within opening 11b of the seal 11 and another end which engages the nut 13. An axial opening within the spring 12 is sized to accept each end 10a, 10b of the U-shaped member 10.

Figure 14B:
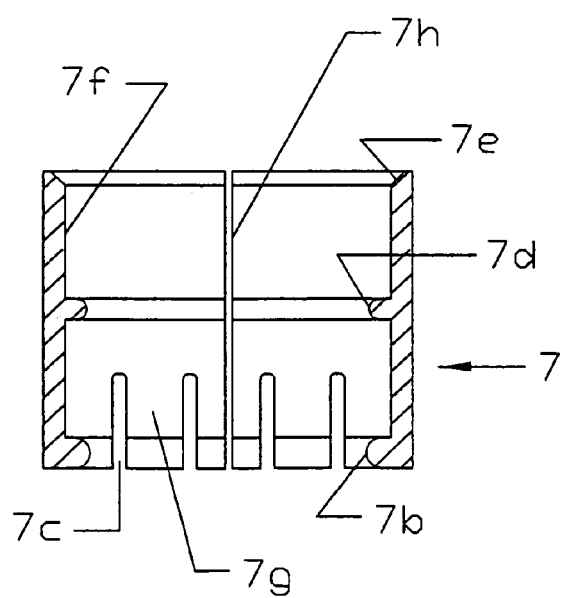
Figure 15:
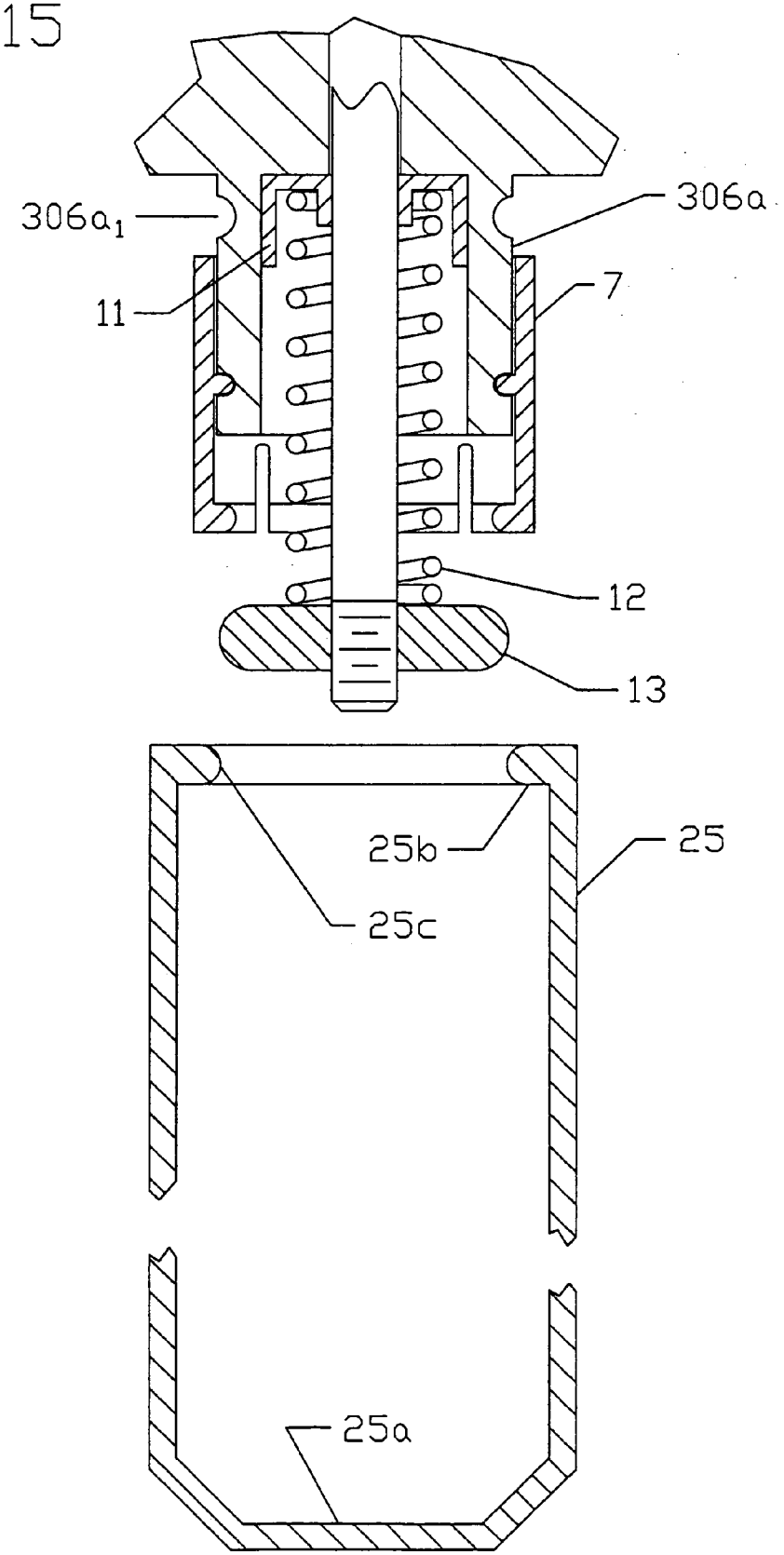
FIG. 15 shows a cross-section enlarged view of the left side cylindrical section shown in FIG. 14a with the seal, spring, and nut already installed on an end of the U-shaped member and with the locking device already installed on the cylindrical section. Also shown is a cross-section enlarged view of the cover (of the type shown in FIGS. 8, 9 and 19) before it is slid onto the cylindrical section.

By comparing FIGS. 13a–13d to FIGS. 14a–14b, it can be seen how each of the seal 11, the spring 12 and the nut 13 is installed each end 10a and 10b (although only end 10a is shown). As should be evident, the seal 11 is first slid into the opening 9a, followed by the spring 12, and then the nut 13 is threaded onto end 10a and tightened. The spring 12 is then placed in compression between the seal 11 and the nut 13. In FIG. 14b, the details of the locking member 7 can be discerned. The locking member 7 is a cylindrical shaped member with one end having a chamfer 7e that is configured to slid onto the cylindrical section 306a. Another end of the locking member 7 has an internal projection whose convex or rounded portion is configured to retain the nut 13 (see e.g., FIG. 16). Also arranged on this end is a plurality of substantially equally spaced slots 7c. The slots 7c allow the portions 7g to deflect outwards when the projections 7b are forced radially outwards upon engagement with the nut 13. Thus, the portions 7g serve as springs which deflect away (not shown) upon engagement with the nut 13 and which recover to the position shown in FIG. 14b (i.e., the straight position) when the nuts 13 are not engaging projection 7b. Arranged on an inner cylindrical surface of the locking member 7 is inwardly facing circumferential projection 7d whose convex of rounded end is sized to fit into the groove 308a. A slot 7h extends the entire length of the locking member 7. The purpose of the slot 7h is to allow the locking member 7 to expand circumferentially when it is installed on to the cylindrical section 308a. As should be evident, the locking member 7 functions in the manner of a spring and accordingly should preferably be made of a spring like material such as, e.g., spring steel. Of course, other spring like materials may also be used provided the locking member 7 functions in the intended way. As can be seen in FIG. 14b, the locking member 7 has not yet been installed onto the cylindrical section 6a, 6b, 206a, 206b, 306a and 306b (only section 306a is shown). To facilitate the installation of the locking member 7 onto each cylindrical section 6a, 6b, 206a, 206b, 306a, 306b, the locking member 7, via the tapered end 7e, is slid onto and over the rim of the cylindrical section 306a. Once the projection 7d engages the cylindrical section 308a, the slot 7h will open wider and finally, when the projection 7d snaps into groove 308a, the slot 7h becomes small again. In this way, the locking member 7 becomes axially fixed to the cylindrical sections (i.e., 6a, 6b, 206a, 206b, 306a, 306b) when the internal projection 7d snaps into the groove, e.g., 308a. The final installation position of the locking member 7 is shown in FIG. 15. Finally, with regard to the particular arrangement or design of the locking member 7, the invention is not intended to be limited to a cylindrical shaped locking member 7. Accordingly, other design configurations of the locking member 7 may be utilized, provided they are able to lock the U-shaped member 10 in the extended position against the biasing force of the spring 12 and provided they allow the U-shaped member 10 to retract when the U-shaped member 10 experiences a predetermined amount of force F, which force F is sufficient to cause the locking member 7 to release the U-shaped member 10 so that it can fully retract.

By comparing FIGS. 9 and 15, it can also be seen how each of dust cover 25 is installed onto each cylindrical section 206a, 206b, 306a and 306b (only end 306a is shown). As should be evident, each dust cover 25 slid onto cylindrical section, e.g., 306a, until its internal circumferential projection 25c with its convex or rounded end snaps into concave circumferential groove, e.g., 306a1.

FIG. 16 illustrates how the spring 12 is compressed between the seal 11 and the nut 13 when the nut 13 is being retained by the locking member 7. This arrangement of the nut 13 being releasably locked between the projection 7b and the rim of the cylindrical section 6a is characterized by the U-shaped member 10 being in the extended position. Although not shown, this arrangement would be the same on the other cylindrical section 6b, when the U-shaped member 10 is in the extended position. As this arrangement should make clear, the nuts 13 (and thereby the U-shaped member 10) are prevented from being pulled out of the mounting part 6, by virtue of the nuts 13 engaging (i.e., being stopped by) the rims of the cylindrical sections 6a and 6b (and similarly with regard to sections 206a, 206b, 306a and 306b).

Figure 17:
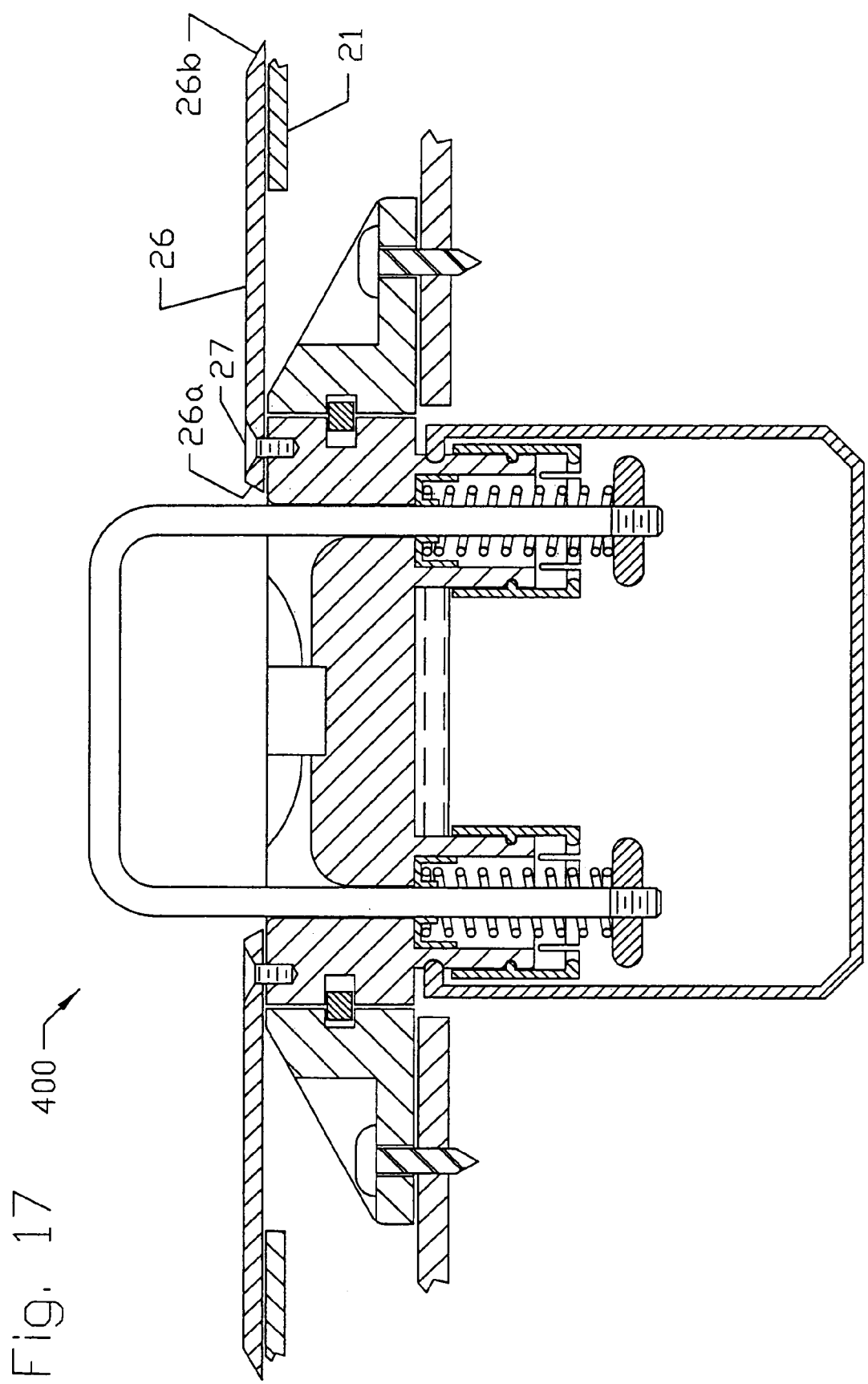
FIG. 17 shows a cross-sectional side view representation of another embodiment of the retractable anchor mounted to the surface of a vehicle having a bed liner. A retractable U-shaped member is again seen in an intermediate position between the extended position and the retracted position. This embodiment differs from that shown in FIG. 1 mainly with regard to its use of a cover plate which overlaps the bed liner.

FIG. 17 shows another embodiment of the retractable anchor 400. The anchor 400 includes most of the features described in FIGS. 1–4 (accordingly they will not be described again), except that it additionally includes a planar square shaped cover or plate 26. The cover 26 is fastened via fasteners 27 (only two of which are shown) to surface 6d of the inner mounting part 6 so as to be rotatably therewith. The cover 26 has an internal square shaped tapered end 26a and an outer peripheral square shaped end 26b. The purpose of the cover 26 is to close off of the opening of covering 21. The cover 26 may be made of any convenient material, conventional or otherwise, such as e.g., plastic or metal. Although not shown, the cover 26 may also be used on any of the other disclosed anchor embodiments. Further, it should be noted that the cover 26 can be made round or circular, oval, polygonal, or rectangular, consistent with the shape of the mounting part.

Figure 18:
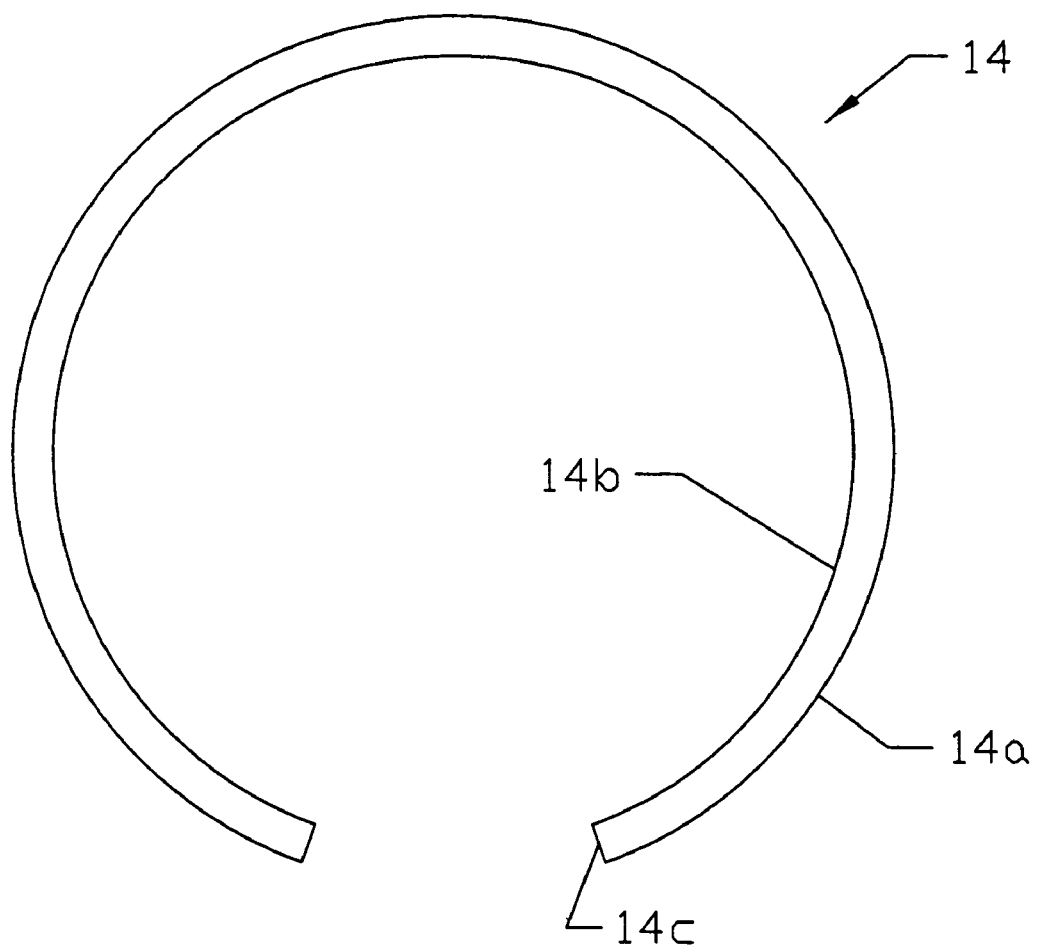
FIG. 18 shows a top view of the lock ring utilized in the embodiments shown in FIGS. 1, 4, 6, 8 and 17.

FIG. 18 shows the ring 14 used in the embodiments shown in FIGS. 1–4, 6–8 and 17. The ring 14 has a polygonal cross-section, an inner diameter 14b and an outer diameter 14a. A gap is provided between end surfaces 14c of the ring 14. The ring 14 is preferably made of a spring type material such as spring steel. Although not shown, each of the embodiments using the ring 14 may also use more than one ring 14, e.g., two or three rings, arranged at some distance from one another axially in similarly spaced grooves 15/16. As should be evident, the gap expands, i.e., circumferentially, when the ring 14 is installed onto the inner mounting part 6 and contracts, i.e., circumferentially, when the ring 14 and inner mounting part 6 are installed into the outer mounting part 2.

Figure 19:
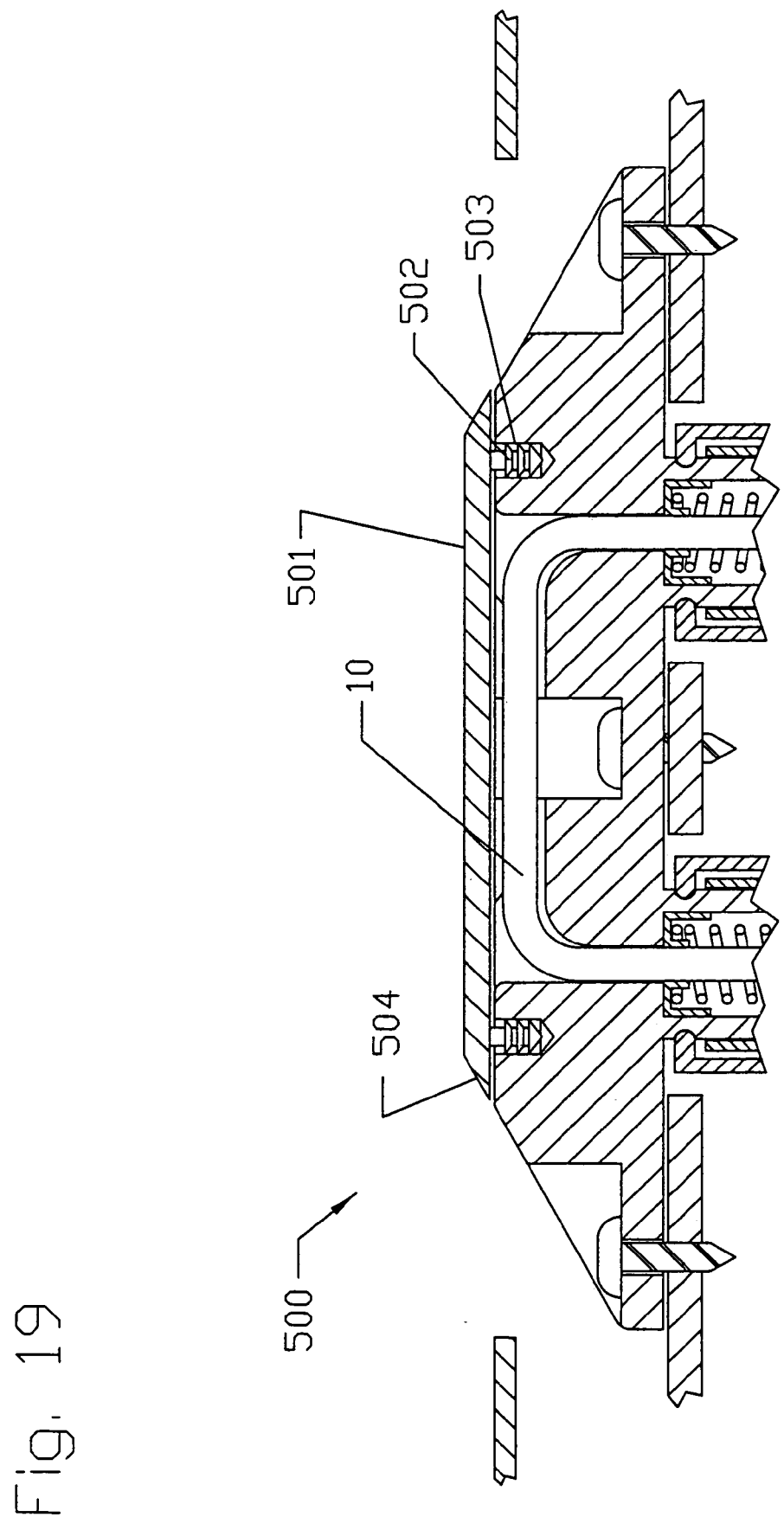
FIG. 19 shows a partial cross-sectional side view representation of another embodiment of the retractable anchor mounted to the surface of a vehicle having a bed liner. A retractable U-shaped member is seen in the retracted position. This embodiment differs from that shown in FIG. 8 mainly with regard to its use of a rectangular shaped removable sealing cover plate which covers the planar upper surface of the mounting part.

FIG. 19 shows another embodiment of the retractable anchor 500. The anchor 500 includes most of the features described in FIGS. 9–11 (accordingly they will not be described again), except that it additionally includes a planar rectangular shaped removable protective cover 501. The cover 501 is removably attachable via pine tree clip type fasteners 502 e.g., 4 or 6 fasteners (only two of which is shown) to surface 302a of the mounting part 302. The pine tree clip type fasteners 502 are inserted in openings 503. The cover 501 has an outer rectangular shaped peripheral tapered end 504. The purpose of the cover 501 is to hide the U-shaped member 10 and to deny access to the U-shaped member 10. The cover 501 may be made of any convenient material, conventional or otherwise, such as e.g., plastic, metal or composite. Although not shown, the cover 501 may also be used on any of the other disclosed anchor embodiments. The cover 501 can also be made square, oval, round or circular, or polygonal consistent with a similarly shaped mounting part. It is also evident from FIG. 19, the cover 501 can only be installed when the U-shaped member 10 is in the retracted position.

Figure 20:
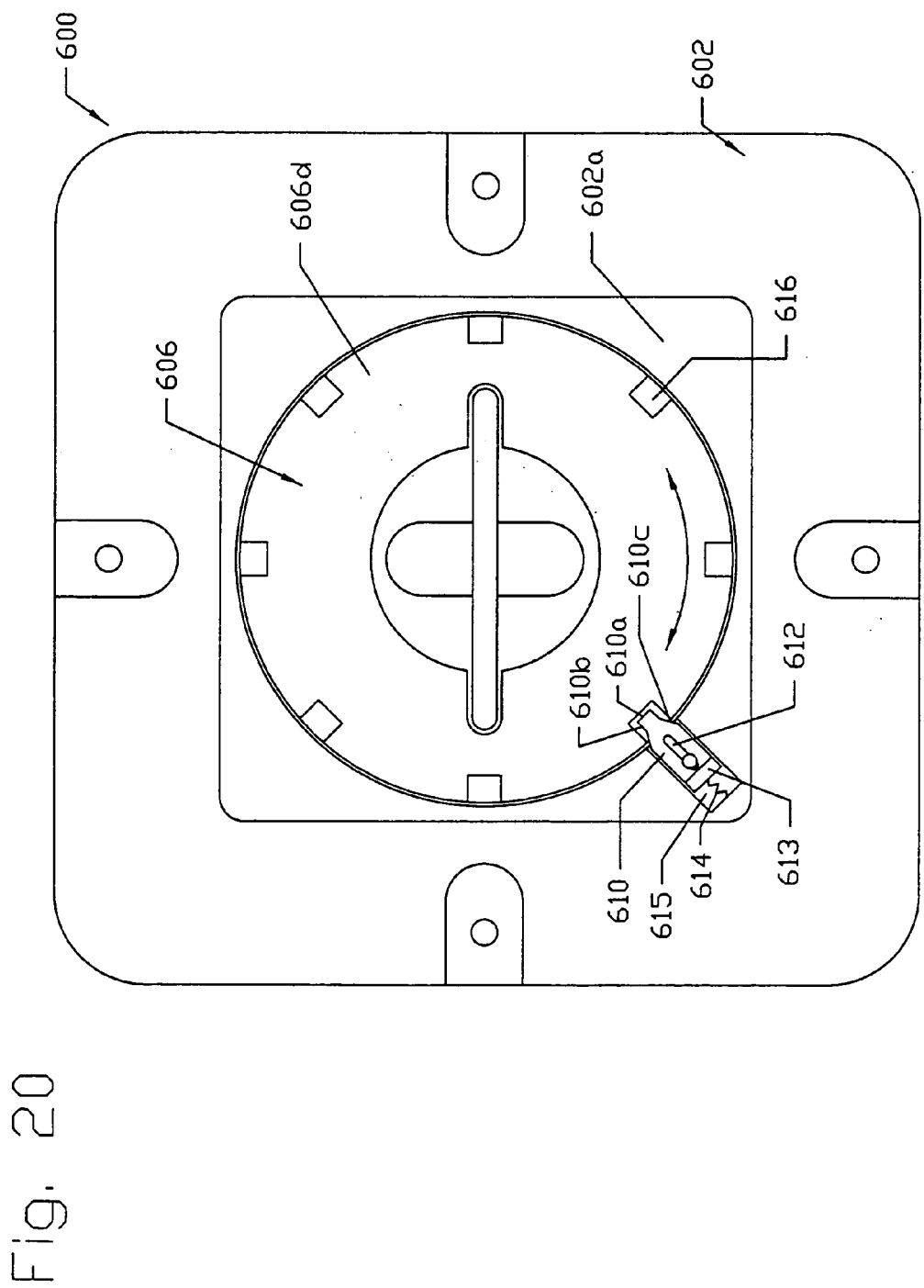
FIG. 20 shows a top view of another embodiment of the retractable anchor similar to that of FIGS. 1–4. This embodiment differs from that shown in FIGS. 1–4 mainly with regard to its additional use of a rotational locking system.
Figure 21:
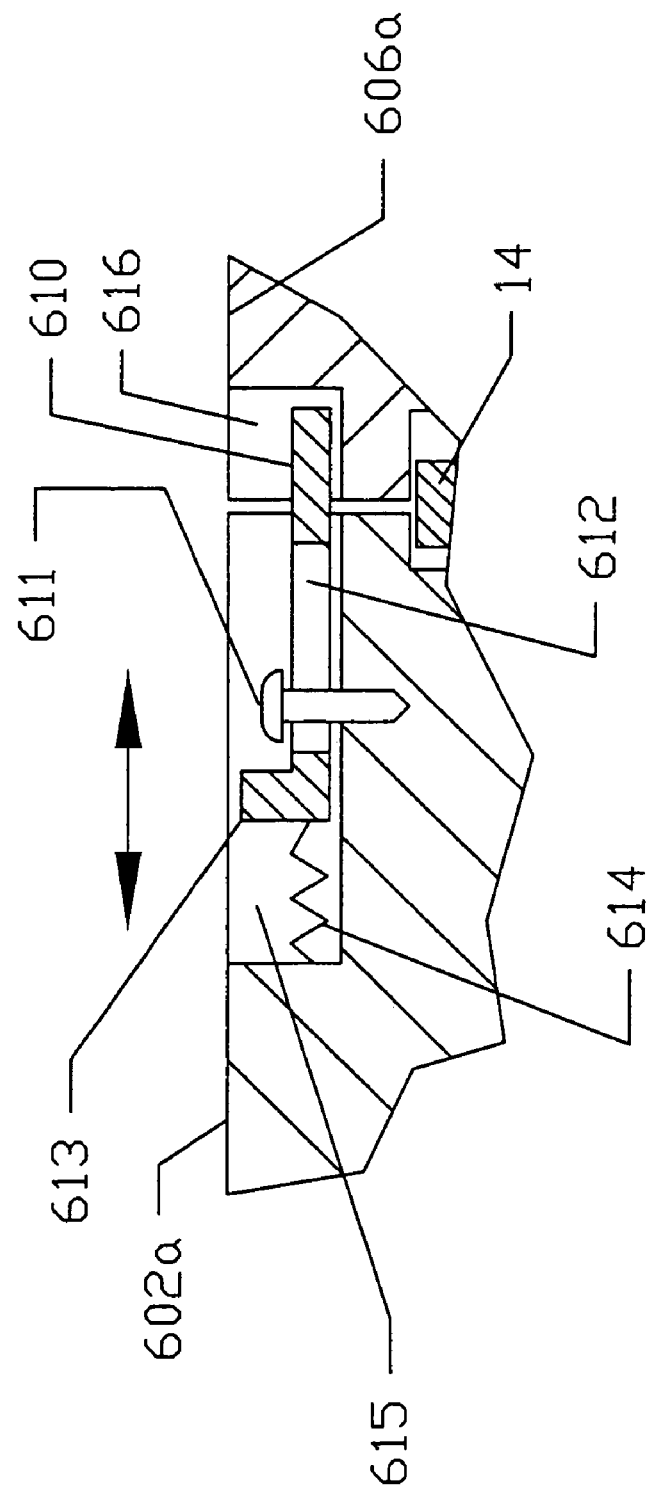
FIG. 21 shows a partial side cross-sectional view of the rotational locking system of the embodiment of FIG. 20.

FIGS. 20 and 21 shows another embodiment of the retractable anchor 600. The anchor 600 includes most of the features described in FIGS. 1–4 (accordingly they will not be described again), except that it additionally includes a rotation locking system which can lock the rotational orientation of the inner mounting part 606 with respect to outer mounting part 602. The locking system includes a movable locking device 610 which is movably mounted in a rectangular shaped recess 615. The locking device 610 is a plate like member which has an engaging end that is configured to engage (i.e., slid into and out of) one of the equally spaced recesses 616. Although eight recesses 616 are shown arranged at approximately 45 degree spacing, the invention contemplates fewer or more such recesses, e.g., 2, 6, 10, 12 etc., in order to enable the user to lock the inner mounting part 606 at a desired angular rotational orientation. The recesses 616 are square shaped recess which are formed as indentations in the surface 606d and which are arranged to open out at the circumference of the inner mounting part 606. The engaging end of the locking device 610 includes a square shaped engaging portion with end 610a and sides 610b which has a smaller width than the locking device 610 (as well as each recess 616). Two tapered portions 610c extend from the portion 610a to a body portion of the locking device 610. The portion 610a/610b is sized to be slidable into the recesses 616 with some clearance. Accordingly, the width of the portion 610a/610b is made less than a width of the recesses 616. The locking device 610 is movable from a locking position, in which the portion 610a is disposed in a recess 616 (as shown in FIG. 20) to a retracted position in which the portion 610a is moved away from the recess (not shown) so that the inner mounting part 606 can rotate. A spring 614 is mounted between a side of the recess 615 and a rear portion of the locking device 610. The spring 614 continuously biases the locking device 610 towards the inner mounting part 606, i.e., the locking position. A miniature flange type handle 613 is provided on the locking device 610 (against the biasing force of spring 614) in order to allow a user to manually retract the locking device 610, so that the inner mounting part 606 can be rotated. The locking device 610 is mounted in the recess 615 via a fastener such as a rivet or a screw 611. A slot 612 is provided in the body of the locking device 610 so that the locking device 610 can slide with respect to the screw 611 yet be prevented from lifting out of the recess 615 by the head of the screw 611. The preferred material for each of the parts is a metal such as, e.g., steel. However, other materials may also be used without leaving the scope of the invention. Additionally, the spring 614 is preferably made of spring steel.

The operation of the rotational locking system will now be described. When the anchor 600 is installed in a vehicle such as a truck, SUV, boat or military vehicle, a user may require that the U-shaped member 10 be oriented in a certain angle so that a strap or rope (or other tension member) can be attached to the U-shaped member to tie down an object. All that is required to orient the U-shaped member 10 is for the user to use one finger to retract the locking device by pulling the handle 613 towards the retracted position (i.e., against the biasing direction of the spring 614). Using another hand, the user can then rotate the inner mounting part 606 (or the U-shaped member 10 if it is in the extended position). When the desired orientation is reached, the user can let go of the handle 613. At this point the spring 614 will force the locking device 610 into the recess 616 which corresponds to the desired angle of orientation. The locking device 610 will then lock and prevent the inner mounting part 606 from rotating in either direction until it is moved (i.e., slid) into the retracted position again.

Figure 22A:
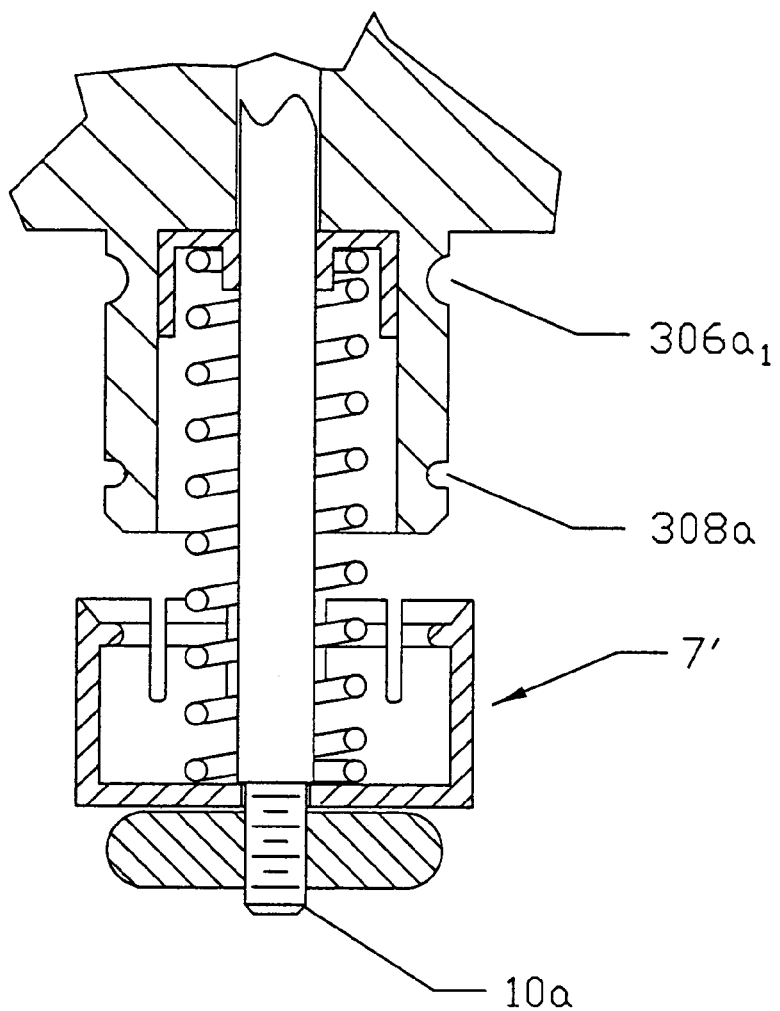
FIGS. 22a–b illustrate how another type of locking device can be used in each of the disclosed embodiments.
Figure 22B:
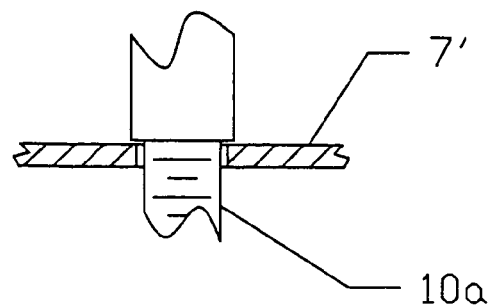

In FIGS. 22*a*–*b* in can be seen the invention may also function with a different locking member 7' (i.e., different from the ones used in each of the already described embodiments). As discussed above, the cylindrical sections 6*a* and 6*b* (or 206*a* and 206*b* and 306*a* and 306*b*) each include a concave circumferential locking member groove 308*a*. This groove 308*a* is sized to accept an internal cylindrical convex projection 7*d* of the locking member 7. However, this groove 308*a* also serves to releasingly engage an internal circumferential projection of the alternative locking member 7'. The projection of the locking member 7' is separated by slots and has a leading tapered edge so that the projection of the locking member 7' will snap into groove 308*a*. A spring 12 is arranged to bias the nut 13 and locking member 7' away from the mounting part. As can be seen in FIG. 22*b*, the locking member 7' has a circular opening which is sized to slide over the threaded end 10*a*, but is smaller in diameter than a diameter of the cylindrical end(s) of the U-shaped member 10. A shoulder is thus defined between the threaded portion and the cylindrical portion of end 10*a* (and of end 10*b*). This shoulder acts to retain the locking member 7' from above. In this way, when the nut 13 is threaded onto end 10*a* and tightened against the locking member 7', the locking member 7' is trapped between the shoulder and the nut 13. As a result, the locking member 7' becomes rigidly connected to the end 10*a* (and another locking member 7' may be secured to end 10*b*) so as to be able to move therewith.

Figure 23:
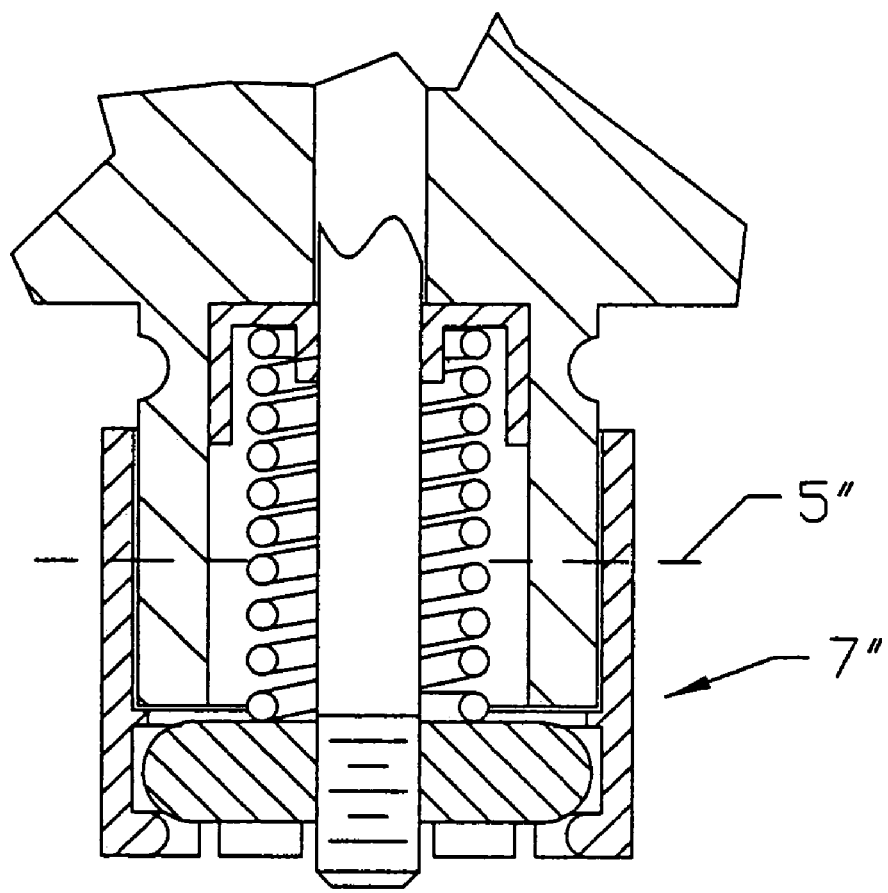
FIG. 23 illustrates how another type of locking device can be used in each of the disclosed embodiments.

In FIG. 23 in can be seen the invention may also function with a different locking member 7" (i.e., different from the ones used in each of the already described embodiments). As discussed above, the cylindrical sections 6*a* and 6*b* (or 206*a* and 206*b* and 306*a* and 306*b*) each include a concave circumferential locking member groove 308*a*. This groove 308*a* is not required if the locking member 7" is utilized because this locking member 7" does not rely on an internal projection for its attachment to each cylindrical section. Instead, the locking member 7" may be attached and/or otherwise secured to the cylindrical sections by screws 5" or by bonding (or both) with adhesives. Although not shown, an even simpler embodiment would provide for the locking member 7" to be integrally formed with each cylindrical section. Such could be accomplished if the mounting part, with the cylindrical sections and locking members, were molded in one piece from a plastic material, such as, e.g., a high strength plastic. The important aspect here is that the locking member 7" be secured to each cylindrical sections, in each disclosed embodiment. Accordingly, any convenient method, conventional or otherwise, of fixing the locking member 7" to each cylindrical section may be utilized. As with the locking member 7 described previously, the locking member has an internal projection which is separated by slots and which can engage the nut. Additionally, the locking member has an internal circumferential shoulder which allows the locking member 7" to be seated on the rim of each cylindrical section. All other functional aspects of this arrangement are similar to that shown and described with regard to, e.g., FIG. 16.

In each of the embodiments, it may be preferred that the exposed surface of the mounting part, i.e., the part which projects above surface 20, be finished which a texture or coating, or with a paint or color, which is indicating of the environment that it is installed. Thus, for example, in the environment of a bed of a pick-up truck, the exposed parts may be colored yellow so that they show up against the black bed liner. Alternatively, they can be made black, so that they do not look so conspicuous. In this way, the anchor devices can be made to look either conspicuous or not, as the application requires. It should also be noted that the typical application will require the use of oppositely arranged anchor devices, i.e., one arranged on one side of a vehicle and another arranged on another side of the vehicle. This allows the object which is to be secured to be tied from two sides, thus ensuring that the object will be more safely tied down. The anchor devices may also have a good application when installed in floors of vehicles since they project from a surface only a small amount. Alternatively, the floor or surface 20 may be recessed by an amount which accommodates the thickness and overall size of the mounting part and so that surface 6*d* is arranged substantially level with the surrounding surface. Such an arrangement could be used in walls, ceilings and floors. Finally, while the anchor device have been described with reference to vehicles of all types, they may also be used in static locations such as buildings.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method of installing a retractable anchor device on a surface wherein the retractable anchor device comprises a mounting part, a generally U-shaped member movably mounted to the mounting part, and a retracting system that causes the U-shaped member to move to a retracted position when the U-shaped member experiences a predetermined external force, the method comprising:

forming at least one opening in the surface, the at least one opening being sized to receive a portion of the retractable anchor device which projects from a back surface of the mounting part;

at least one of fixing, attaching, fastening and removably securing the mounting part to the surface; and ensuring that the U-shaped member is movable between an extended position and the retracted position, the extended position being characterized by the U-shaped member extending out from the mounting part by a greater amount than when the U-shaped member is in the retracted position, wherein the retracting system causes movement of the U-shaped member towards the mounting part from the extended position to the retracted position when the U-shaped member experiences the predetermined external force.

2. The method of claim 1, wherein the retractable anchor device further comprises first and second biasing mechanisms, the first biasing mechanism biasing a first end of the U-shaped member towards the retracted position and the second biasing mechanism biasing a second end of the U-shaped member towards the retracted position.

3. The method of claim 1, wherein the retractable anchor device further comprises an actuator, wherein the actuator moves the U-shaped member towards at least one of the extended position and the retracted position.

4. The method of claim 1, wherein the mounting part comprises an outer mounting part and an inner mounting part movably mounted to the outer mounting part, and wherein the method further comprises rotating the inner mounting part.

5. The method of claim 1, further comprising moving the U-shaped member between the extended position whereby at least a portion of the U-shaped member is positioned above an upper surface of the mounting part, and the retracted position whereby the U-shaped member is positioned approximately flush with or below the upper surface of the mounting part.

6. The method of claim 1, wherein the U-shaped member automatically moves to the retracted position from the extended position when the U-shaped member experiences the predetermined external force.

7. The method of claim 1, wherein the mounting part comprises an outer mounting part which is secured to the surface and an inner movable mounting part, wherein the U-shaped member is slidably movably mounted to the inner movable mounting part, and wherein the method further comprises rotating the inner movable mounting part and locking the inner movable mounting part relative to the outer mounting part.

8. The method of claim 1, further comprising releasably locking, with a locking system, the U-shaped member in the extended position.

9. The method of claim 8, wherein the locking system includes a first locking mechanism which releasably prevents movement a first end of the U-shaped member towards the retracted position and a second locking mechanism which releasably prevents movement a second end of the U-shaped member towards the retracted position.

10. The method of claim 1, wherein the retracting system comprises an actuator, and wherein the method further comprises moving, with the actuator, the U-shaped member towards at least one of the extended position and the retracted position.

11. The method of claim 10, further comprising causing, with one of a force sensing system and a load sensing system, the actuator to move the U-shaped member towards the retracted position.

12. The method of claim 1, wherein the mounting part comprises at least one indented or recessed area which allows a user to grip the U-shaped member with the user's fingers, and wherein the method comprises gripping the U-shaped member and then moving the U-shaped member to the extended position.

13. The method of claim 1, wherein the retracting system comprises first and second biasing mechanisms, the first biasing mechanism being mounted onto a first end of the U-shaped member in an area between an end of the first end and a bottom surface of the mounting part and the second biasing mechanism being mounted onto a second end of the U-shaped member in an area between an end of the second end and a bottom surface of the mounting part.

14. The method of claim 1, further comprising arranging a first sealing member so as to provide sealing between a first end of the U-shaped member and the mounting part and arranging a second sealing member so as to provide sealing between a second end of the U-shaped member and the mounting part.

15. The method of claim 1, further comprising arranging a first nut on a first end of the U-shaped member, arranging a second nut on a second end of the U-shaped member, and arranging first and second locking members on the mounting part, whereby the first and second nuts releasably engage the first and second locking members.

16. The method of claim 1, further comprising locking the U-shaped member in the extended position.

17. The method of claim 1, further comprising mounting one of a housing, an enclosure, and a cover to a back portion of the mounting part.

18. The method of claim 1, further comprising mounting a cover to a front surface of the mounting part.

19. A method of installing a retractable anchor device on a surface wherein the retractable anchor device comprises a mounting part, a generally U-shaped member movably mounted to the mounting part, and a retracting system that biases the U-shaped member towards a retracted position, the method comprising:

forming at least one opening in the surface, the at least one opening being sized to receive a portion of the retractable anchor device which projects from a back surface of the mounting part;

at least one of fixing, attaching, fastening and removably securing the mounting part to the surface;

ensuring that the U-shaped member is movable between an extended position and the retracted position, the extended position being characterized by the U-shaped member extending out from the mounting part by a greater amount than when the U-shaped member is in the retracted position; and locking the U-shaped member in the extended position, wherein the retracting system causes automatic movement of the U-shaped member towards the mounting part from the extended position to the retracted position when the U-shaped member experiences a force sufficient to unlock the U-shaped member.

20. A method of installing a retractable anchor device on a surface wherein the retractable anchor device comprises a mounting part, a generally U-shaped member movably mounted to the mounting part, and a retracting system that moves the U-shaped member towards a retracted position, the method comprising:

forming at least one opening in the surface, the at least one opening being sized to receive a portion of the retractable anchor device which projects from a back surface of the mounting part;

at least one of fixing, attaching, fastening and removably securing the mounting part to the surface;

ensuring that the U-shaped member is movable between an extended position and the retracted position, the extended position being characterized by the U-shaped member extending out from the mounting part by a greater amount than when the U-shaped member is in the retracted position;

maintaining the U-shaped member in the extended position; and moving with the retracting system the U-shaped member towards the mounting part from the extended position to the retracted position when the U-shaped member experiences a force that is sufficient to cause the U-shaped member to move towards the retracted position.

* * * * *